(12) United States Patent
Sawada

(10) Patent No.: US 8,342,616 B2
(45) Date of Patent: Jan. 1, 2013

(54) BRAKE CONTROL APPARATUS

(75) Inventor: Mototsugu Sawada, Kariya (JP)

(73) Assignee: Advics Co., Ltd., Aichi-pref. (JP)

( * ) Notice: Subject to any disclaimer, the term of this patent is extended or adjusted under 35 U.S.C. 154(b) by 359 days.

(21) Appl. No.: 12/764,608

(22) Filed: Apr. 21, 2010

(65) Prior Publication Data
US 2010/0270855 A1    Oct. 28, 2010

(30) Foreign Application Priority Data
Apr. 22, 2009  (JP) ................................. 2009-104168

(51) Int. Cl.
*B60T 8/66*    (2006.01)
(52) U.S. Cl. .................. 303/113.2; 303/113.5; 303/149; 303/156; 303/158; 701/73
(58) Field of Classification Search ........................ None
See application file for complete search history.

(56) References Cited

U.S. PATENT DOCUMENTS

| | | | |
|---|---|---|---|
| 6,203,122 B1* | 3/2001 | Ehmer et al. .................. 303/186 |
| 7,530,648 B2* | 5/2009 | Obai ........................... 303/119.1 |
| 7,699,411 B2* | 4/2010 | Nakaura et al. ............... 303/156 |
| 7,857,399 B2* | 12/2010 | Kito et al. ................... 303/119.1 |
| 8,068,967 B2* | 11/2011 | Schutz et al. ................... 701/73 |
| 8,100,482 B2* | 1/2012 | Kito et al. ..................... 303/148 |
| 2006/0097568 A1* | 5/2006 | Breitenbacher et al. ... 303/119.1 |
| 2006/0255659 A1* | 11/2006 | Obai ............................. 303/146 |
| 2008/0103669 A1* | 5/2008 | Kudo et al. ..................... 701/80 |
| 2009/0095551 A1* | 4/2009 | Sawada et al. ............... 180/197 |
| 2009/0127929 A1* | 5/2009 | Sawada et al. .......... 303/122.09 |

FOREIGN PATENT DOCUMENTS

| | | |
|---|---|---|
| JP | A-6-107156 | 4/1994 |
| JP | A-2001-260838 | 9/2001 |

* cited by examiner

*Primary Examiner* — Bradley King
*Assistant Examiner* — Thomas Irvin
(74) *Attorney, Agent, or Firm* — Posz Law Group, PLC

(57) ABSTRACT

An object of the invention is to reduce an influence of deviation in pressure increasing performance, which would be caused by individual differences of pressure increase valves, so that a desired braking force may be obtained. A moderate pressure increasing operation is carried out for wheel cylinder pressure of a wheel, which is on a high μ-road, wherein a demand differential pressure for a pressure increase valve is set at a first target pressure for a first time period and then switched to a second target pressure for a second time period. The influence of the deviation may be absorbed during the moderate pressure increasing operation, so that a difference of wheel cylinder pressure between front left and front right wheels may be reduced.

3 Claims, 15 Drawing Sheets

BRAKE CONTROL APPARATUS

CROSS REFERENCE TO RELATED APPLICATION

This application is based on Japanese Patent. Application No. 2009-104168 filed on Apr. 22, 2009, the disclosure of which is incorporated herein by reference.

FIELD OF THE INVENTION

The present invention relates to a brake control apparatus for a vehicle, according to which a differential pressure between a master cylinder side and a wheel cylinder side is adjusted by controlling a pressure increase valve provided for each of wheels, so that a brake fluid pressure for each wheel cylinder (also referred to as a wheel cylinder pressure) is controlled.

The present invention is preferably applied to a brake control apparatus having functions for ABS (Anti-lock Brake System) control for preventing a locked condition of the wheels during a braking operation and/or for EBD (Electronic Brake force Distribution) control for adjusting distribution of braking forces between front and rear wheels.

BACKGROUND OF THE INVENTION

According to a conventional brake control apparatus, for example as disclosed in Japanese Patent Publication No. H06-107156, a spin of a vehicle on a μ-split road is suppressed by switching from an "independence limiting control" to a "select-low control" (or vice versa) for a front wheel on a high μ-road to carry out a braking operation, so that a braking force is obtained as much as possible.

The "μ-split road" here means a road, which has different coefficients of friction for a left wheel and a right wheel. The "high μ-road" means a road, which has a higher coefficient of friction.

According to a general ABS control, a control mode (a pressure decreasing mode, a pressure holding mode, and a pressure increasing mode) for each of wheels is individually selected depending on a slip ratio of respective wheels. According to the "independence limiting control", either one of the left and right wheels (for which the slip ratio is larger than the other) is selected as a subject wheel for the ABS control. When the control mode for the subject wheel is in the pressure increasing mode, a control mode for the other wheel (for which the slip ratio is smaller) is read in. When the control mode for the subject wheel is in the pressure decreasing mode, and the control mode for the other wheel is in the pressure increasing mode, an increase inclination of a braking force is limited. According to such a control, a difference of the wheel cylinder pressure between the subject wheel and the other (non-subject) wheel is prevented from becoming too large.

The "select-low control" is a control, according to which a pressure decreasing operation is carried out for a wheel (right or left) on a high μ-road together with a pressure decreasing operation of ABS control for another wheel (left or right) on a low μ-road, irrespectively whether a condition for starting the ABS control is satisfied or not for the wheel on the high μ-road.

According to the independence limiting control, a larger braking force is generated for the wheel on the high μ-road than a braking force for the wheel on the low μ-road, so that the larger braking force is applied to a vehicle as much as possible. However, on a large μ-split road, on which the coefficients of friction between the left and right sides are largely different from each other, a difference of slip ratio between the left and right wheels would become larger. It would become more difficult to suppress a yaw torque applied to the vehicle and a vehicle spin may be likely to occur. Therefore, in the case of the larger μ-split road, not the independence limiting control but the select-low control is selected. Although, the braking force obtained in the select-low control is smaller than the braking force of the independence limiting control, the possible vehicle spin can be prevented by making the braking forces generated at the front left and front right wheels equal to each other, to thereby suppress the yaw torque applied to the vehicle.

According to another conventional brake control apparatus, for example as disclosed in Japanese Patent Publication No. 2001-260838, the EBD control is carried out for improving a braking efficiency, so that the wheel cylinder pressure for the rear wheels is controlled to become lower than the wheel cylinder pressure for the front wheels, to an extent that the wheel cylinder pressure for the rear wheels may not be largely departed from a brake fluid pressure generated at a master cylinder (a M/C pressure). Electromagnetic valves provided for respective wheels are controlled to be turned on and off (a fluid passage is opened and closed), so that the wheel cylinder pressure for a subject wheel is increased in a pulse form.

When pressure increase valves are simply opened and closed during the pressure increasing control for the ABS operation or for the EBD operation, the differential pressure may be generated more than necessary. As a result, noise and vibration may be generated. A linear control is carried out for the pressure increase valve, according to which a driving current to the pressure increase valve is controlled such that the differential pressure between an upstream and a downstream side of the pressure increase valve is linearly changed, in order to prevent the generation of the differential pressure more than necessary. As a result, the generation of the noise and vibration are suppressed.

However, when the linear control is carried out for the pressure increase valve, deviation of differential pressure with respect to the driving current may be generated due to individual difference of the pressure increase valves.

In the case that the pressure increase valves are provided for the left and right wheels, wherein the pressure increase valves have the deviation in their performances, a differential pressure of the wheel cylinder pressure generated at respective wheel cylinders for the left and right wheels may correspondingly have a deviation from a desired value. As a result, a difference of the wheel cylinder pressure between the left and right wheels may become larger, and the differential pressure for the wheel cylinder pressure of the respective left and right wheels may not be controlled within a predetermined range, even when the select-low control is carried out on the μ-split road. In such a case, the yaw torque may be generated in the vehicle. In particular, when the vehicle is running on the μ-split road, it may become difficult to sufficiently suppress the yaw torque to be applied to the vehicle and thereby it may become difficult to effectively prevent the possible vehicle spin.

On the other hand, if the difference of the wheel cylinder pressure between the left and right wheels would become smaller, the wheel cylinder pressure of the wheel on the high μ-road could not be made sufficiently higher relative to the wheel cylinder pressure of the wheel on the low μ-road, in spite that a larger braking force is desired to be generated for the wheel on the high μ-road. Therefore, in such a case, it may be a problem that a desired braking force may not be obtained as a whole.

In addition, when the EBD control is carried out, the driving current is likewise supplied to a solenoid of the pressure increase valve in order to generate a desired differential pressure at the valve. However, the desired differential pressure may not be generated, when the differential pressure actually generated is deviated from an expected value due to the individual difference, even though the driving current corresponding to the desired differential pressure is supplied to the pressure increase valve.

Furthermore, it may not be possible to increase the wheel cylinder pressure for the rear wheels by an amount of the deviation, when the wheel cylinder pressure for the rear wheels is controlled to gradually become closer to the wheel cylinder for the front wheels, if there exists deviation due to the individual difference of the pressure increase valve. Then, it would become difficult to obtain a desired braking force. In addition, it would be difficult to make the wheel cylinder pressure for the rear wheels equal to the wheel cylinder pressure for the front wheels.

As above, it may be a problem, if it would become difficult to control the braking forces for the front and rear wheels by properly distributing the braking force to the front and rear wheels during the EBD control.

The problems are explained above for the cases of the ABS control having the select-low control on the μ-split road and the EBD control. However, such problems (which would be caused by the individual difference of the pressure increase valve) may exist in any kinds of the brake control apparatuses, in which the differential pressure is generated by linearly operating the pressure increase valves so as to control the wheel cylinder pressure.

SUMMARY OF THE INVENTION

The present invention is, therefore, made in view of the foregoing problem, and has an object to provide a brake control apparatus, according to which an influence of the individual difference for pressure increase valves may be reduced to obtain desired braking force.

According to a feature of the invention, a brake control apparatus for a vehicle has pressure increase valves connected between a master cylinder and wheel cylinders for controlling a differential pressure between an upstream and a downstream sides of the respective pressure increase valves when power supply amount to each of solenoids of the pressure increase valves is linearly controlled, so that wheel cylinder pressure of brake fluid applied to each of the wheel cylinders is increase during a braking operation. The brake control apparatus has an electronic control unit for controlling each of the pressure increase valves.

The electronic control unit has a power supply amount control portion for controlling the power supply amount to the solenoid of the pressure increase valve, which corresponds to the wheel cylinder for which a pressure increasing operation is carried out, in such a manner that a demand differential pressure for such subject pressure increase valve is alternately set at a first target pressure and a second target pressure, wherein the second target pressure is higher than the first target pressure. The electronic control unit further has a first differential pressure setting portion for setting the first target pressure in such a manner that the first target pressure is decreased in a stepwise manner each time when the demand differential pressure is switched from the first target pressure to the second target pressure.

As above the moderate pressure increasing operation is carried out, wherein the first and second target pressures are alternately switched from one to the other. It is, therefore, possible to suppress an occurrence of such a situation, in which a desired braking force may not be obtained as a result of deviation of pressure increasing performances due to individual differences of the pressure increase valves. In addition, since the first target pressure is not fixed to a constant value but gradually decreased in the stepwise manner, deviation of the wheel cylinder pressure from a desired value (which would be generated based on the deviation of the differential pressure with respect to the master cylinder pressure, resulting from the individual difference of the pressure increase valves) may be decreased during the moderate pressure increasing operation. As a result, the braking force can be further controlled closer to a desired value.

According to another feature of the present invention, the first differential pressure setting portion decreases the first target pressure with a first predetermined decremental slope.

According to a further feature of the present invention, the electronic control unit further comprises a second differential pressure setting portion for setting the second target pressure in such a manner that the second target pressure is decreased in a stepwise manner each time when the demand differential pressure is switched from the second target pressure to the first target pressure.

As above, the second target pressure is also gradually decreased in the stepwise manner, so that the second target pressure is controlled to be a minimum required value for keeping the differential pressure between the upstream and downstream sides of the pressure increase valve. It is, therefore, possible to suppress generation of noise and vibration, which would be otherwise generated if the differential pressure would be generated more than necessary.

According to a still further feature of the present invention, the electronic control unit comprises a second differential pressure setting portion for setting the second target pressure in such a manner that the second target pressure is decreased in a stepwise manner each time when the demand differential pressure is switched from the second target pressure to the first target pressure, wherein the second differential pressure setting portion decreases the second target pressure with a second predetermined decremental slope, which is larger than the first predetermined decremental slope.

As above, since the second target pressure is decreased with the second predetermined decremental slope (which is larger than the first predetermined decremental slope), it is possible to bring the wheel cylinder pressure closer to the master cylinder pressure in an earlier stage, when a difference between the master cylinder pressure and the wheel cylinder pressure becomes smaller.

According to a still further feature of the present invention, the electronic control unit carries out an anti-skid control for preventing a locked condition of wheels during the braking operation, wherein the electronic control unit carries out a select-low control when the vehicle is running on a μ-split road, so that a pressure decreasing operation of the anti-skid control is carried out for not only the wheel on a low μ-road but also the wheel on a high μ-road when the anti-skid control is started for the wheel on the low μ-road, irrespectively whether a condition for starting the anti-skid control for the wheel on the high μ-road is satisfied or not.

In addition, the electronic control unit linearly changes the power supply amount to the solenoid of the pressure increase valve, which corresponds to the wheel cylinder for which a pressure increasing operation of the anti-skid control is carried out, to control the differential pressure of the subject pressure increase valve, so that the wheel cylinder pressure for the subject wheel cylinder is increased.

According to the brake control apparatus for carrying out the above anti-skid control, the electronic control unit comprises a calculating portion for respectively calculating estimated wheel cylinder pressures for a front left and a front right wheels, and a determination portion for determining whether the vehicle is running on the μ-split road and whether each of the front left and front right wheels is on the high μ-road or on the low μ-road, based on the respective estimated wheel cylinder pressures for the front left and front right wheels. And the electronic control unit controls the power supply amount to the solenoid of the pressure increase valve, which corresponds to the front wheel on the high μ-road, when the pressure increasing operation of the anti-skid control is carried out for the wheel on the high μ-road, so that the demand differential pressure for the subject pressure increase valve is alternately changed to the first and second target pressures.

According to the above feature of the invention, it is possible to carry out the moderate pressure increasing operation for the wheel on the high μ-road and to absorb the deviation of the pressure increasing performance. Accordingly, it is possible to suppress a difference of the wheel cylinder pressure between the front left and front right wheels within a predetermined range. It is possible to suppress the generation of yaw torque applied to the vehicle and to prevent the vehicle spin.

According to a still further feature of the present invention, the electronic control unit controls distribution of braking force between front wheels and rear wheels, so that the wheel cylinder pressure for the rear wheels is controlled to be lower than the wheel cylinder pressure for the front wheels in order to prevent a locked condition for the rear wheels. The electronic control unit linearly changes the power supply amount to the solenoid of the pressure increase valve, which corresponds to the wheel cylinder of the rear wheels for which a pressure increasing operation of the braking force distribution control is carried out, to control the differential pressure of the subject pressure increase valve, so that the wheel cylinder pressure for the subject wheel cylinder is increased.

Furthermore, the electronic control unit controls the power supply amount to the solenoid of the pressure increase valve corresponding to the subject rear wheel, when the pressure increasing operation of the braking force distribution control is carried out for the subject rear wheel, so that the demand differential pressure for the subject pressure increase valve is alternately changed to the first and second target pressures.

According to the above feature, the moderate pressure increasing operation is carried out for the wheel cylinder pressure for the subject rear wheel. It is, therefore, possible to suppress the deviation of pressure increasing performances due to individual differences of the pressure increase valves. As a result, the desired braking force is generated for the rear wheels.

According to a still further feature of the present invention, the electronic control unit controls distribution of braking force between front wheels and rear wheels, so that the wheel cylinder pressure for the rear wheels is controlled to be lower than the wheel cylinder pressure for the front wheels in order to prevent a locked condition for the rear wheels. In addition, the electronic control unit linearly changes the power supply amount to the solenoid of the pressure increase valve, which corresponds to the wheel cylinder of the rear wheels for which a pressure increasing operation of the braking force distribution control is carried out, to control the differential pressure of the subject pressure increase valve, so that the wheel cylinder pressure for the subject wheel cylinder is increased.

Furthermore, the electronic control unit comprises a power supply amount control portion for controlling the power supply amount to the solenoid of the subject pressure increase valve, in such a manner that a demand differential pressure for the subject pressure increase valve is alternately set at a first target pressure and a second target pressure, wherein the second target pressure is higher than the first target pressure.

As above, since the first and second target pressures are alternately switched from one to the other, it is possible to decrease the deviation between an actual differential pressure and an assumed differential pressure for the rear wheel, for which the control for the braking force distribution is carried out. Accordingly, the moderate pressure increasing operation can be carried out for the wheel cylinder pressure for the subject rear wheel. It is, therefore, possible to suppress the deviation of pressure increasing performances due to individual differences of the pressure increase valves. As a result, the desired braking force is generated for the rear wheels.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
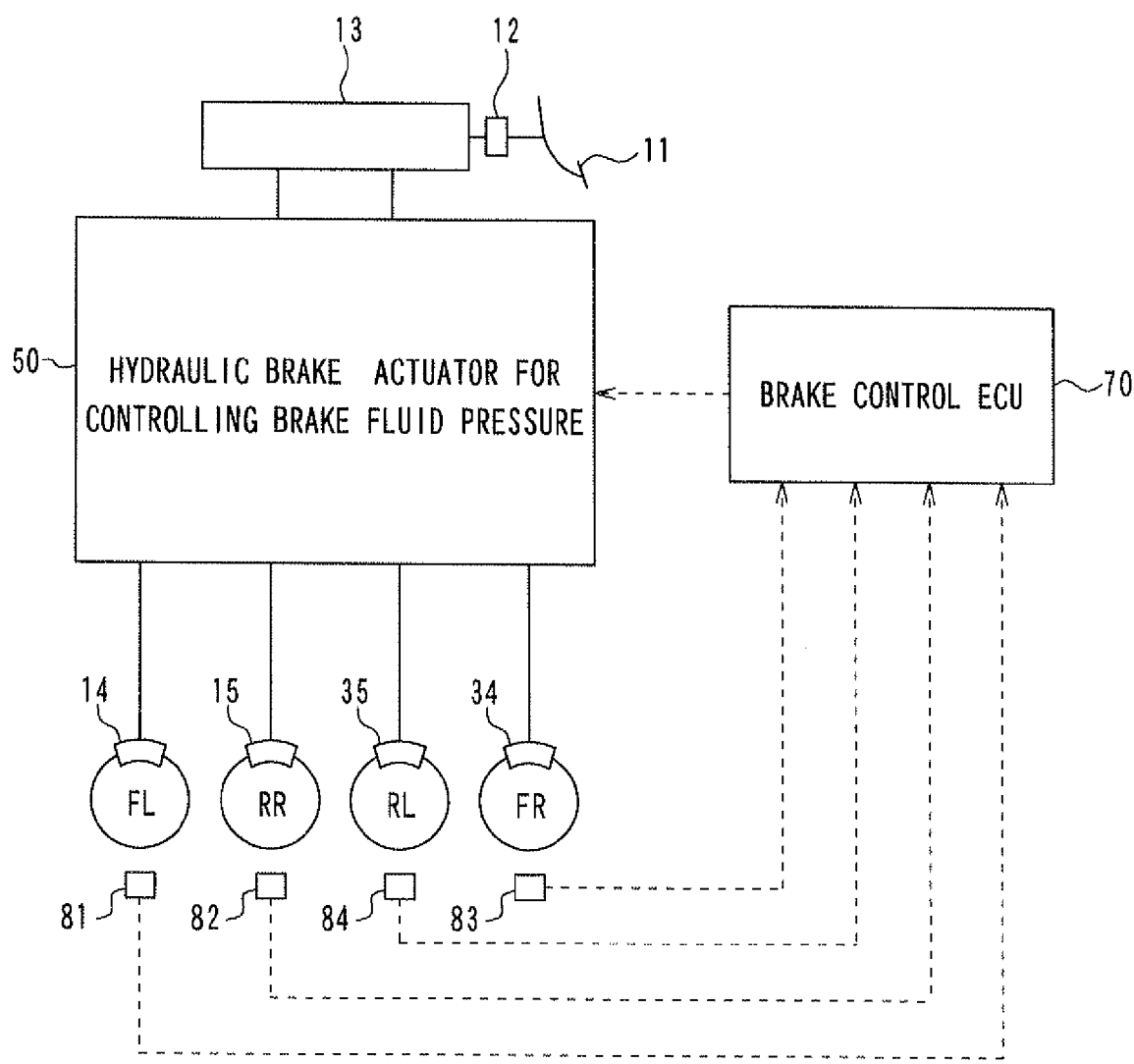
FIG. 1 is a schematic view showing a block diagram of a brake control apparatus according to a first embodiment of the present invention.

Embodiments of the present invention will be explained with reference to the drawings. In the following embodiments, the same reference numerals are used for the same or similar parts or portions to each other.

First Embodiment

A first embodiment of the present invention will be explained. FIG. 1 shows a block diagram for a brake control apparatus 1 according to the present embodiment.

The brake control apparatus 1 according to the present embodiment will be explained. As shown in FIG. 1, the brake control apparatus 1 has a brake pedal 11, a brake booster 12, a master cylinder (M/C) 13, wheel cylinders (W/C) 14, 15, 34 and 35, and a hydraulic brake actuator 50 for controlling brake fluid pressure. The brake control apparatus 1 has a brake control ECU 70 for controlling a braking force generated by the brake control apparatus 1. More exactly, the brake control apparatus 1 has wheel speed sensors 81 to 84 respectively provided for each wheel (FL, FR, RL, RR) and outputting a detecting signal (pulse signal) depending on a wheel speed. The detecting signals from those wheel sensors 81 to 84 as well as detecting signals from other sensors (explained below) are inputted to the brake control ECU 70, so that the brake control ECU 70 carries out various calculations based on such inputted detection signals in order to control the braking force.

Figure 2:
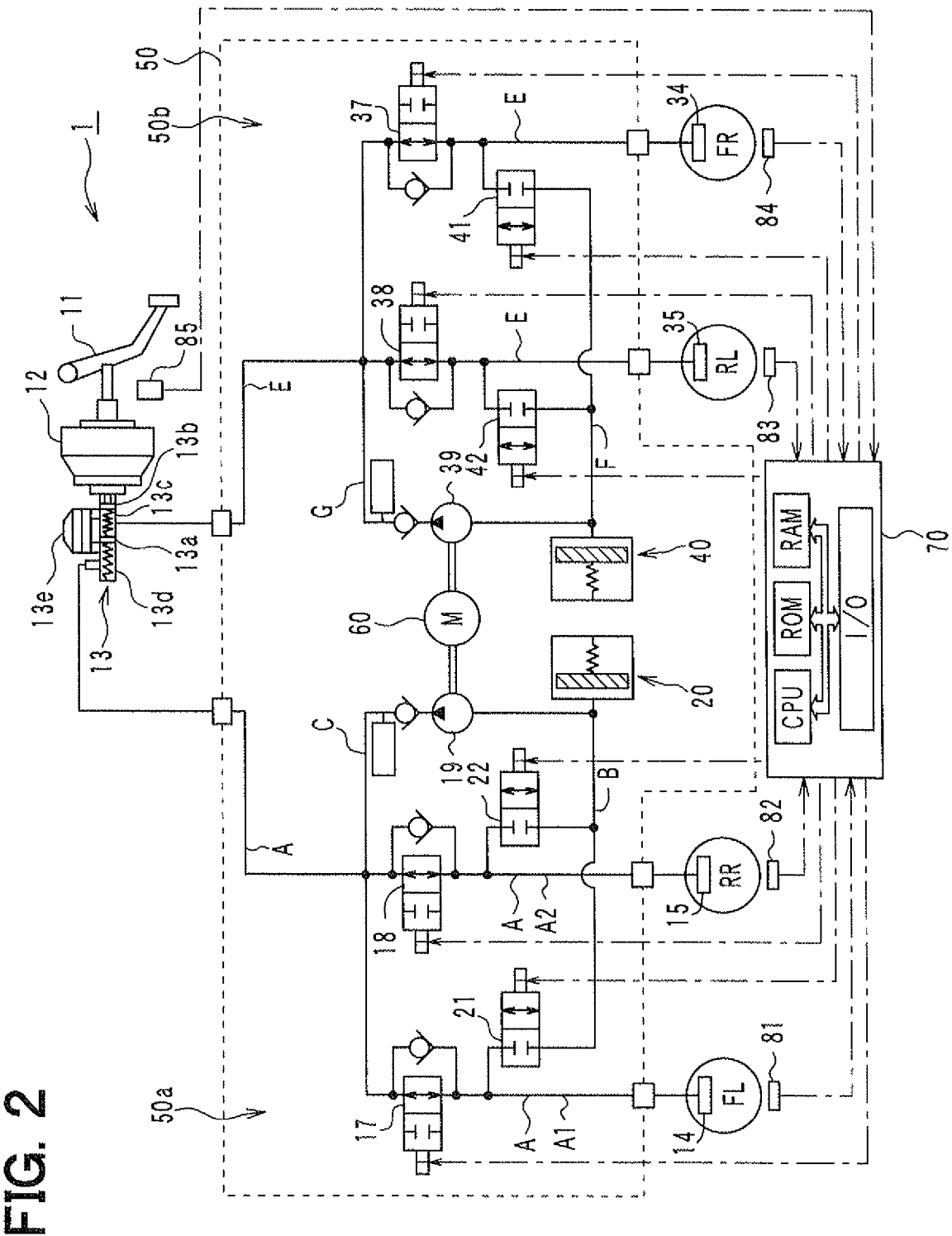
FIG. 2 schematically shows an example for a structure of a hydraulic brake actuator.

FIG. 2 shows a detailed structure of respective components for the brake control apparatus 1. As shown in FIG. 2, when the brake pedal 11 is stepped by a vehicle driver, the stepping force is increased by the brake booster 12 to push master pistons 13a and 13b provided in the master cylinder 13. The master cylinder pressure (M/C pressure) is generated in each of a primary chamber 13c and a secondary chamber 13d, which are defined by the master pistons 13a and 13b, wherein the M/C pressures in the primary and secondary chambers 13c and 13d are the same to each other. The M/C pressures are applied to the respective wheel cylinders 14, 15, 34, 35 through the hydraulic brake actuator 50 for controlling brake fluid pressure.

The master cylinder 13 has a master reservoir 13e, which has fluid passages for communicating the primary and secondary chambers 13c and 13d with each other.

The hydraulic brake actuator 50 has a first hydraulic circuit 50a and a second hydraulic circuit 50b. The first hydraulic circuit 50a controls the brake fluid pressure to be applied to the wheel cylinders 14 and 15 of the front left wheel FL and the rear right wheel RR, whereas the second hydraulic circuit 50b controls the brake fluid pressure to be applied to the wheel cylinders 34 and 35 of the front right wheel FR and the rear left wheel RL.

Since the first and second hydraulic circuits 50a and 50b have the same structure to each other, an explanation will be made hereinafter only for the first hydraulic circuit 50a. An explanation for the second hydraulic circuit 50b is therefore omitted.

The first hydraulic circuit 50a has a main fluid passage A, through which the M/C pressure of the master cylinder 13 is applied to the wheel cylinder 14 for the front left wheel FL as well as the wheel cylinder 15 for the rear right wheel RR, so that the wheel cylinder pressure (W/C pressure) is generated at the respective wheel cylinders.

The main fluid passage A is branched out to fluid passages A1 and A2. A first pressure increase valve 17 is provided in the fluid passage A1 for controlling the pressure increase of the brake fluid to the wheel cylinder 14, and a second pressure increase valve 18 is likewise provided in the fluid passage A2 for controlling the pressure increase of the brake fluid to the wheel cylinder 15.

Each of the first and second pressure increase valves 17 and 18 operates as a linear valve for controlling a differential pressure generated between an upstream side and a downstream side of the valve in a linear manner. Each of the pressure increase valves 17 and 18 is composed of an electromagnetic valve of a normally opened type, wherein a valve position is switched from a communication state (an opened state) to a non-communication state (a closed state) and vice versa. Each of the pressure increase valves 17 and 18 is operated as the linear valve when a driving current depending on a demand differential pressure from the brake control ECU 70.

A fluid passage B connects each of intermediate points between the first and second pressure increase valves 17 and 18 and the wheel cylinders 14 and 15 with a pressure regulating reservoir 20. A first and a second pressure decrease valve 21 and 22 are respectively provided in the fluid passage B. Each of the pressure decrease valve 21 and 22 is composed of an electromagnetic 2-position valve, wherein a valve position is switched from a communication state (an opened state) to a non-communication state (a closed state) and vice versa. And those pressure decrease valves 21 and 22 are normally closed type valves.

A fluid passage C is provided as a fluid return line between the pressure regulating reservoir 20 and the main fluid passage A. A fluid pump 19 driven by an electric motor 60 is provided in the fluid passage C, wherein the pump 19 draws the brake fluid from the pressure regulating reservoir 20 and pumps out pressurized brake fluid to the master cylinder 13 or to the wheel cylinders 14 and 15.

The brake control ECU 70 controls an operation of the brake control apparatus 1 and is composed of a well known micro computer having CPU, ROM, RAM and I/O. The ECU 70 carries out processes, such as various calculations for brake control (ABS control and so on) in accordance with programs stored in the ROM and the like. For example, the ECU 70 receives detection signals from the wheel speed sensors 81 to 84 shown in FIGS. 1 and 2, to calculate wheel speeds of the respective wheel, to calculate a vehicle speed based on the wheel speeds, and to calculate a vehicle deceleration by differentiating the vehicle speed. A detection signal from a stop lamp switch (STP) 85 is also inputted to the ECU 70, so that the ECU 70 may determine whether the vehicle is in a braking operation or not.

Based on electrical signals from the brake control ECU 70, current supply control to the respective control valves (17, 18, 21, 22, 37, 38, 41, 42) of the hydraulic brake actuator 50 as well as voltage supply control to the electric motor 60 for driving the fluid pumps (19, 39) is carried out. As a result, the W/C pressure of the working fluid for the respective wheel cylinders 14, 15, 34, 35 are controlled to thereby control braking forces at the respective wheels FL-RR.

More exactly, a driving voltage is applied to the electric motor 60 from the ECU 70 and driving current is supplied to solenoids of the respective control valves 17, 18, 21, 22, 37, 38, 41, 42, so that each of the control valves is operated in accordance with the driving current and a braking pressure line(s) is selected. The braking fluid pressure is generated in the wheel cylinder(s) 14, 15, 34, 35 depending on the selected braking pressure line(s). The braking forces to be generated at the respective wheels FL RR are thereby controlled.

Figure 3:
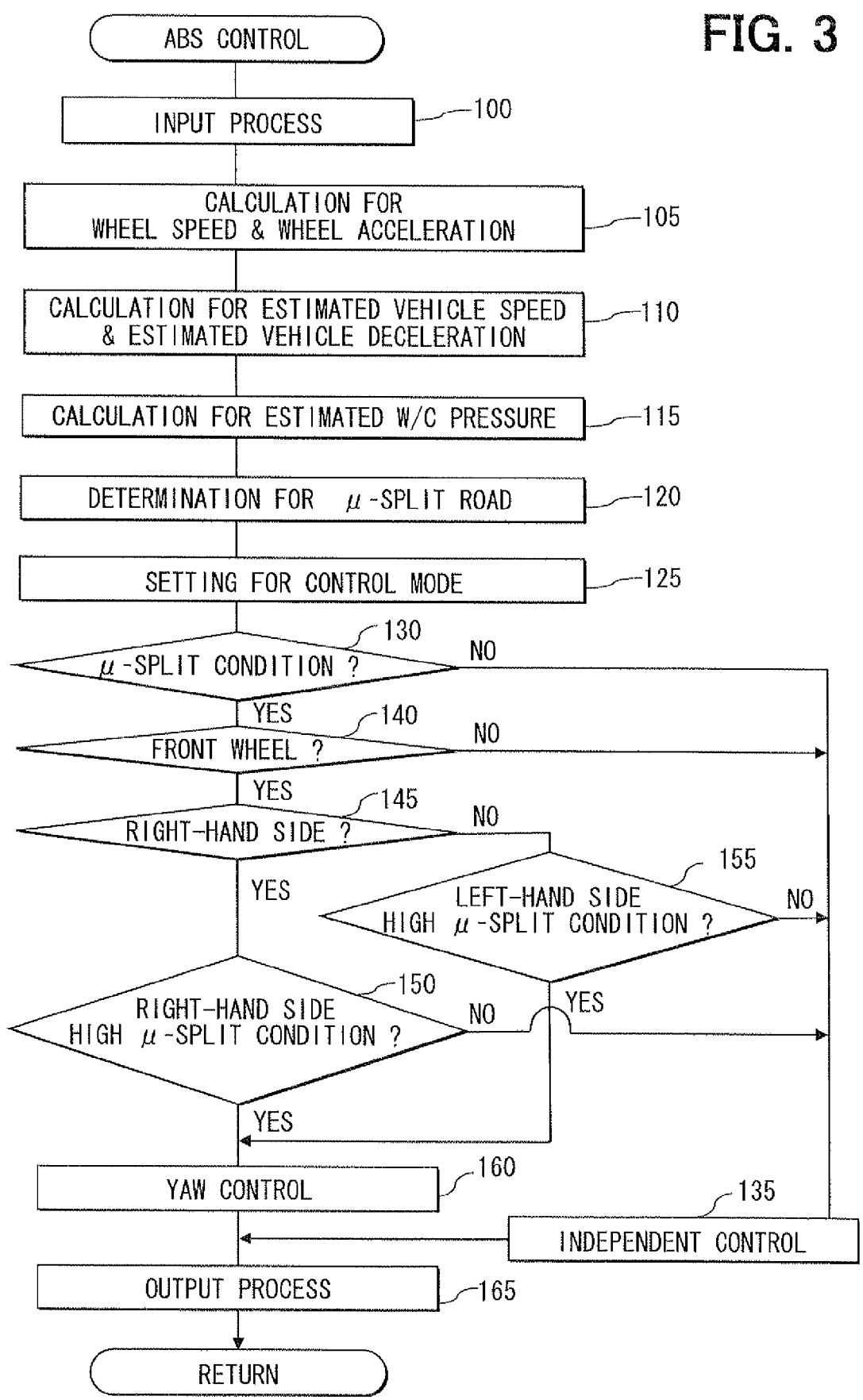
FIG. 3 is a flow chart showing a process for ABS control including a pressure control on a μ-split road.
Figure 4:
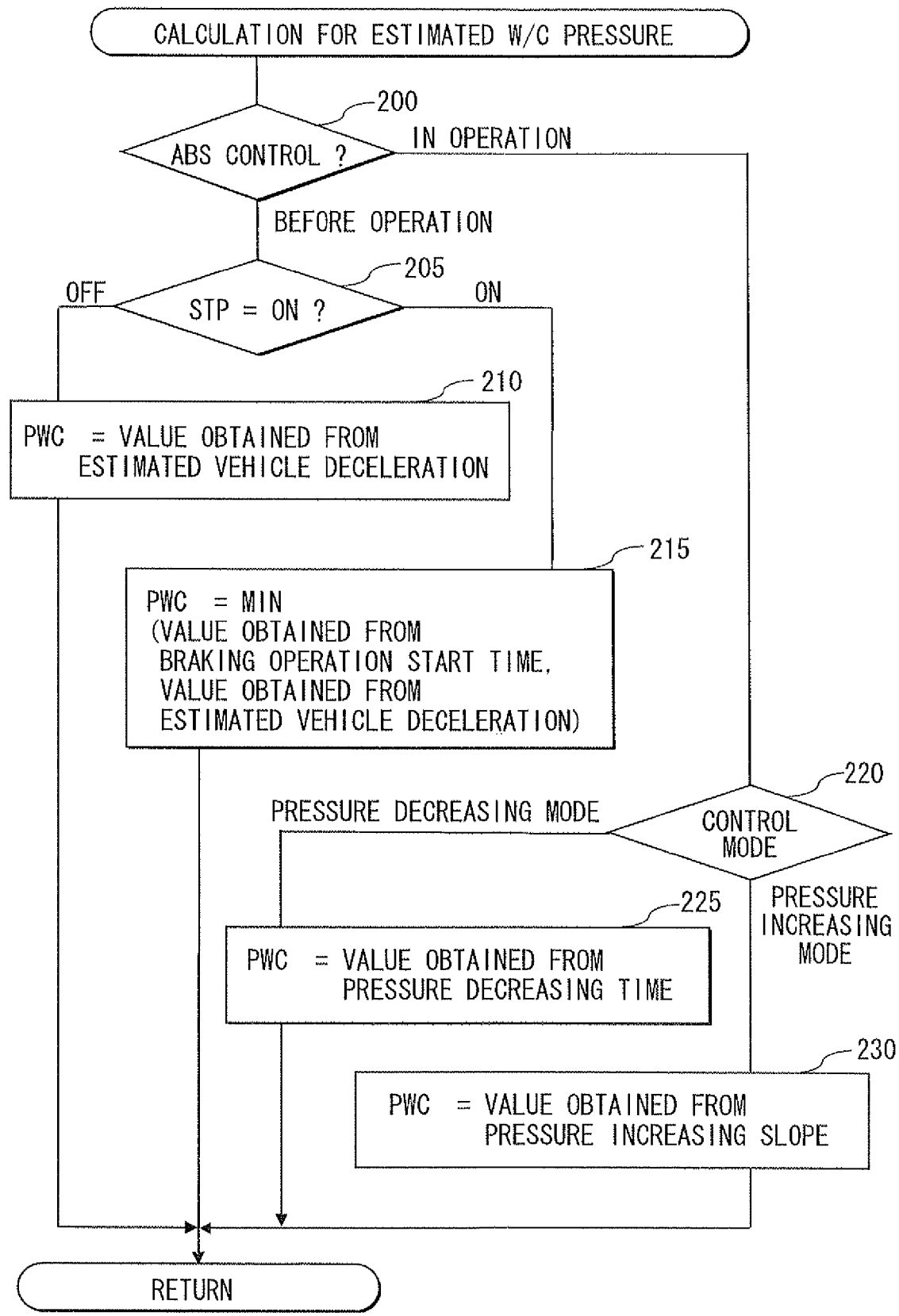
FIG. 4 is a flow chart showing a process for calculating an estimated wheel cylinder pressure.
Figure 5:
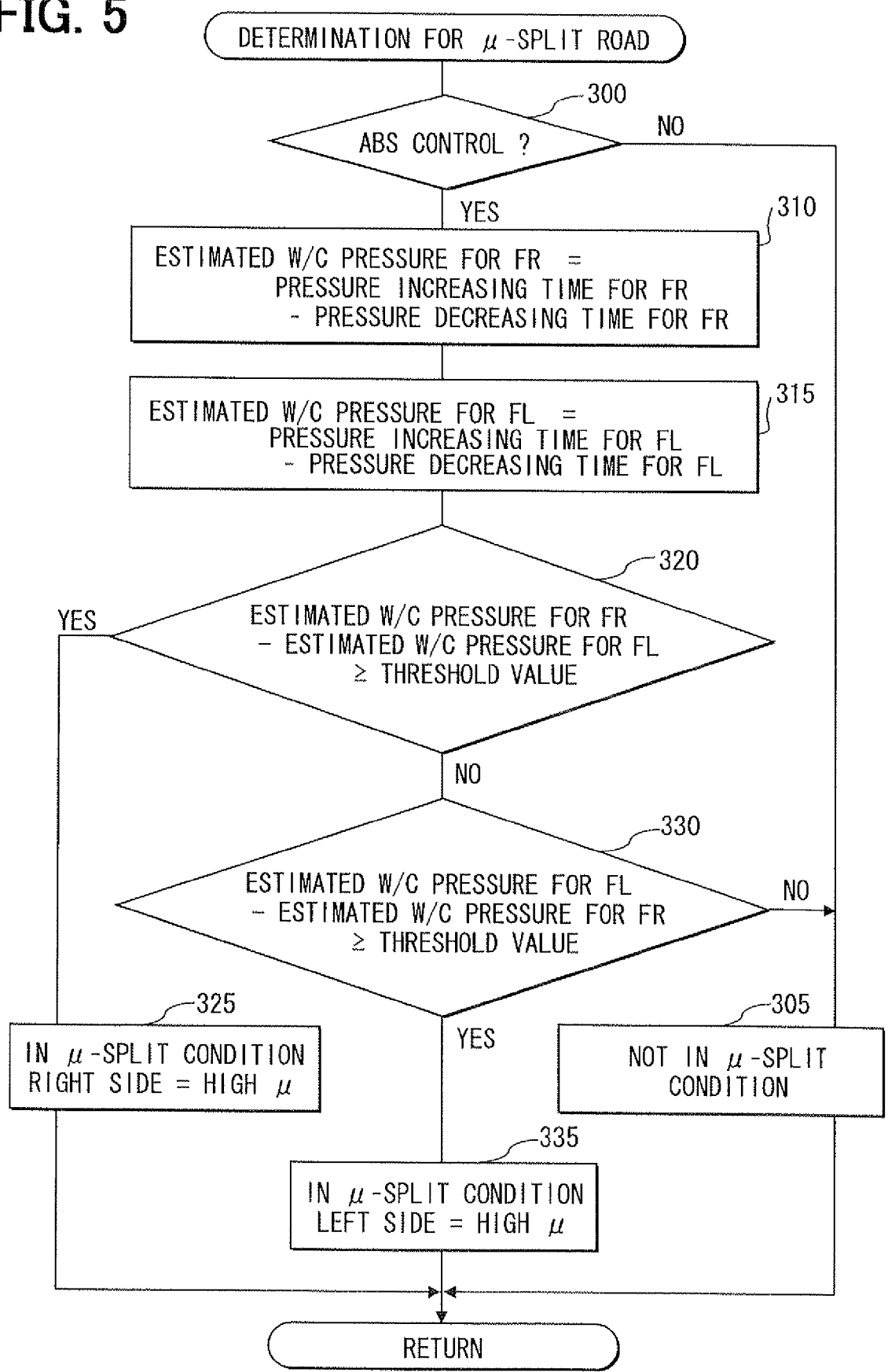
FIG. 5 is a flow chart showing a process for determining a μ-split condition.
Figure 6:
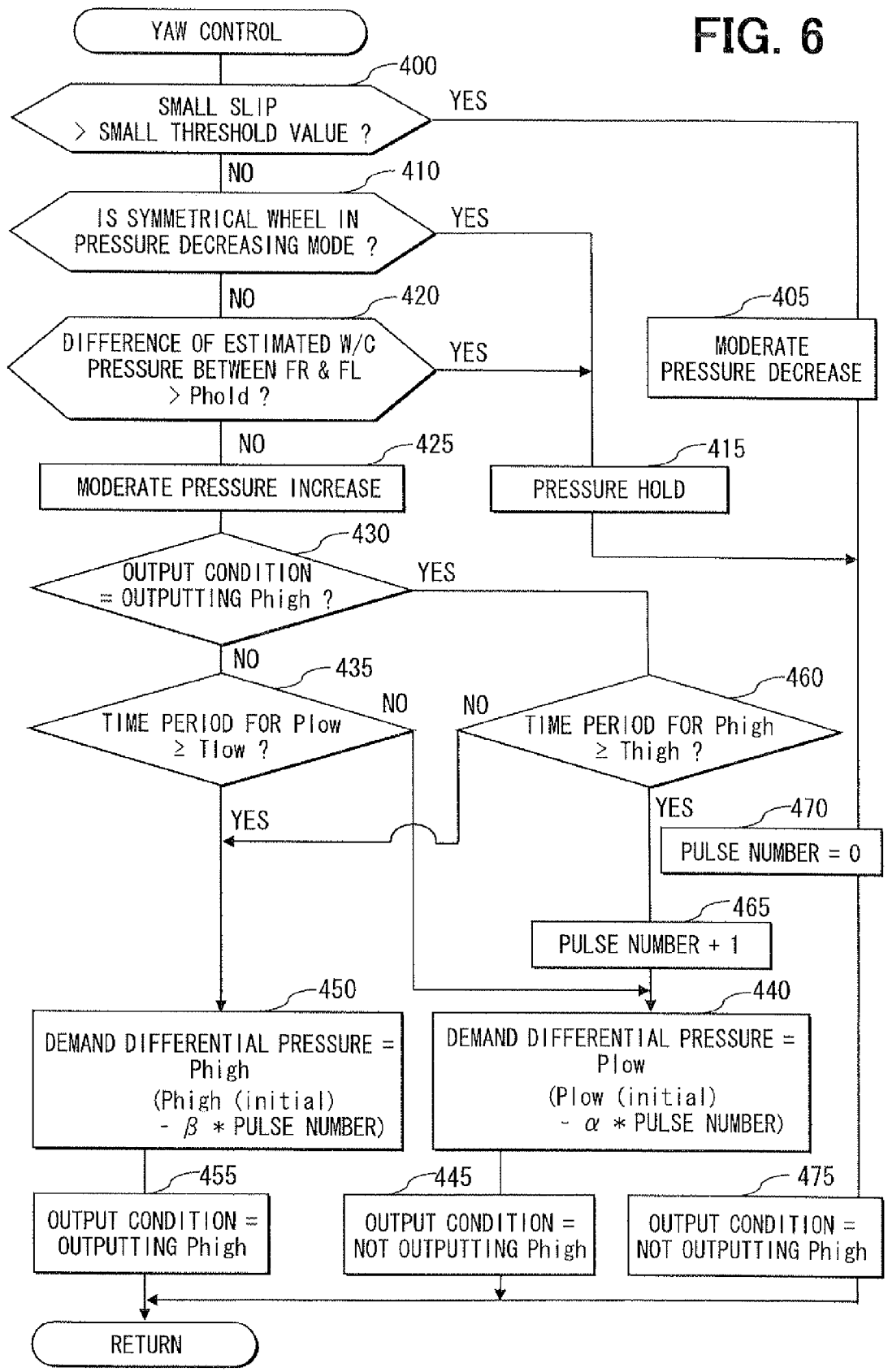
FIG. 6 is a flow chart showing a process for a yaw control during an ABS operation.

An operation of ABS control of the above explained brake control apparatus 1 will be explained. FIG. 3 is a flow chart showing processes for the ABS control, including a control for a case of a μ-split road (which is a road having different coefficients of friction for left and right wheels of a vehicle). FIGS. 4 to 6 are flowcharts respectively showing processes for sub routines related to the ABS control. The process for the ABS control shown in FIG. 3 is repeatedly carried out in a predetermined time interval for the respective wheels, when an ignition switch (not shown) is turned on.

At first, at a step 100 in FIG. 3, an input process is carried out. More exactly, the detection signals from the wheel speed sensors 81 to 84 as well as the stop lamp switch 85 are inputted to the ECU 70. At a step 105, the ECU 70 calculates wheel speeds of the respective wheels and wheel accelerations of the respective wheels by differentiating the wheel speeds. At a step 110, the ECU 70 calculates estimated vehicle speed based on the wheel speeds of the respective wheels in a well known manner, and further calculates estimated wheel acceleration for the respective wheels by differentiating the estimated vehicle speed.

At a step 115, the ECU 70 calculates estimated W/C pressure. FIG. 4 is a flow chart showing a process for calculating the estimated W/C pressure.

At a step 200 in FIG. 4, the ECU determines whether the ABS control is being operated or not. As explained below, the ECU 70 determines at a step 125 (for setting a control mode) of FIG. 3 whether a condition for starting the ABS control is satisfied or not. When it is satisfied, a flag for indicating that the ABS control is in operation is set. Therefore, the ECU 70 determines at the step 200 whether the flag is set or not, in order to determine that the ABS control is being operated. In the case that the ABS control is not in operation (that is, before operation of the ABS control), the process goes to a step 205.

At the step 205, the ECU 70 determines whether the stop lamp switch (STP) 85 is pressed (turned on) or not. When the stop lamp switch 85 is not pressed, the braking operation is not carried out and the process goes to a step 210, at which the ECU 70 calculates the estimated W/C pressure "PWC" based on the estimated vehicle deceleration (a negative definite of the estimated vehicle acceleration). A relationship between the estimated vehicle deceleration and the estimated W/C pressure "PWC" can be expressed in a form of a well known map or an arithmetic expression. Therefore, the estimated W/C pressure "PWC" can be obtained from the estimated vehicle deceleration by way of the map or the arithmetic expression. Although, the estimated W/C pressure "PWC" is obtained at this step 210, the estimated W/C pressure "PWC" would be basically "zero", because the braking operation is not carried out.

On the other hand, when the stop lamp switch 85 is pressed at the step 205, namely when the braking operation is being carried out, the process goes to a step 215. At the step 215, a first value (for the estimated W/C pressure) is calculated based on a braking operation start time. At the same time, a second value (for the estimated W/C pressure) is calculated based on the estimated vehicle deceleration. And whichever is smaller between the first and second values is finally selected as the estimated W/C pressure "PWC". Since a method for calculating the first value for the estimated W/C pressure based on the braking operation start time is known in the art, explanation thereof is omitted.

When the ECU 70 determines at the step 200 that the ABS control is in operation, the process goes to a step 220, at which the ECU 70 determines whether a control mode is in a pressure decreasing mode or a pressure increasing mode. As explained below, the control mode is set (selected) at the step 125 (for setting the control mode) of FIG. 3. Therefore, at the step 220, the ECU 70 reads the selected control mode set at the step 125.

When the control mode is in the pressure decreasing mode, the process goes to a step 225, at which the ECU 70 calculates the estimated W/C pressure "PWC" in the following manner. At first, the estimated W/C pressure "PWC" obtained at the step 215 is regarded as a reference value. Then, a pressure decreasing amount, which would correspond to a pressure decreasing amount during a time period of pressure decreasing operation of the ABS control, is subtracted from the reference value. Namely, the estimated W/C pressure "PWC" is calculated by subtracting the estimated pressure decreasing amount (depending on the pressure decreasing time period) from the estimated W/C pressure "PWC" obtained at the step 215.

When the control mode is in the pressure increasing mode, the process goes to a step 230, at which the ECU 70 calculates the estimated W/C pressure "PWC" in the following manner. At first, the estimated W/C pressure "PWC" obtained at the step 215 is likewise regarded as a reference value. Then, a pressure increasing amount, which is calculated from a pressure increasing slope of the ABS control, is added to the reference value. Namely, the estimated W/C pressure "PWC" is calculated by adding the estimated pressure increasing amount to the estimated W/C pressure "PWC" obtained at the step 215.

As above (as shown in FIG. 4), the estimated W/C pressure "PWC" is calculated for the respective cases (210, 215, 225, 230).

Then, the process goes to a step 120 in FIG. 3, at which the ECU 70 determines whether a road (on which a vehicle is running) is the μ-split road or not, and whether a road surface for either a right-hand side or a left-hand side wheel is a high μ-road surface or not. FIG. 5 is a flow chart showing processes for determination of the μ-split road.

At a step 300 of FIG. 5, the ECU 70 determines at first whether the ABS control is in operation or not, as in the same manner to the step 200. When the determination is NO, the process goes to a step 305, at which the ECU 70 determines that the road (on which the vehicle is running) is not in a μ-split condition.

Although the vehicle is running on the μ-split road, the road may not be regarded as being in such a condition, in which a vehicle spin is likely to occur due to a difference of μ-condition between the right-hand and left-hand side wheels. Therefore, at the step 305, the ECU 70 determines that the road is not in the μ-split condition.

When the determination at the step 300 is YES, the process goes to a step 310.

At the step 310, the ECU 70 calculates the estimated W/C pressure at the front right wheel FR. The estimated W/C pressure at the front right wheel FR is in proportion to a difference between a pressure increasing time for the front right wheel FR and a pressure decreasing time for the front right wheel FR. Therefore, the difference is expediently regarded as the estimated W/C pressure at the front right wheel FR. The pressure increasing time for the front right wheel FR is a pressure increasing time set for the ABS operation of the pressure increasing mode. In the same manner, the pressure decreasing time for the front right wheel FR is a pressure decreasing time set for the ABS operation of the pressure decreasing mode.

In a similar manner, at a step 315, the ECU 70 calculates the estimated W/C pressure at the front left wheel FL. Since the estimated W/C pressure at the front left wheel FL is likewise in proportion to a difference between a pressure increasing time for the front left wheel FL and a pressure decreasing time for the front left wheel FL, the difference is expediently regarded as the estimated W/C pressure at the front left wheel FL. Each of the pressure increasing time and the pressure decreasing time for the front left wheel FL is respectively a pressure increasing and a pressure decreasing time set for the ABS operation of the pressure increasing and pressure decreasing mode.

Then, the process goes to a step 320, at which the ECU 70 determines whether a difference between the estimated W/C pressure at the front right wheel FR and the estimated W/C pressure at the front left wheel FL, which are respectively calculated at the steps 310 and 315, is larger than a predetermined threshold value or not. In the case of YES, namely when the estimated W/C pressure at the front right wheel FR is larger than the estimated W/C pressure at the front left wheel FL by the predetermined value, the process goes to a step 325. At the step 325, the ECU 70 determines that the road is in the μ-split condition and the road for the right-hand side wheel FR is a higher μ-road than the road for the left-hand side wheel FL.

In the case of NO at the step 320, the process goes to a step 330, at which the ECU 70 determines whether a difference between the estimated W/C pressure at the front left wheel FL and the estimated W/C pressure at the front right wheel FR, which are respectively calculated at the steps 310 and 315, is larger than a predetermined threshold value or not. The predetermined threshold value may be the same value used at the step 320. In the case of YES, namely when the estimated W/C pressure at the front left wheel FL is larger than the estimated W/C pressure at the front right wheel FR by the predetermined value, the process goes to a step 335. At the step 335, the ECU 70 determines that the road is in the μ-split condition and the road for the left-hand side wheel FL is a higher μ-road than the road for the right-hand side wheel FR.

In case of NO at the step 320 and at the step 330, the difference between the estimated W/C pressure at the front right wheel FR and the estimated W/C pressure at the front left wheel FL is not large enough to determine as the μ-split condition. Therefore, the process goes to the step 305, at which the ECU 70 determines that the road is not in the μ-split condition, as already explained above.

As explained above, the μ-split condition for the road is determined.

Then, the process goes to the step 125 of FIG. 3, at which the ECU 70 sets the control modes for the ABS operation. More exactly, at the step 125, the ECU 70 determines at first whether the condition for starting the ABS control is satisfied or not. Then, the ECU 70 sets one of control modes, among a pressure decreasing mode, a pressure holding mode, and a pressure increasing mode, when the operation for the ABS control is started. The ECU 70 also determines at the step 125 whether a condition for stopping the ABS control is satisfied or not. Since those determinations are well known in the art, the detailed explanation thereof is omitted.

According to the present invention, when a slip ratio of the wheel on the low μ-road exceeds a predetermined threshold value for starting the operation of the ABS control, an operation of the select-low control is started. According to the select-low control, the pressure decreasing control of the ABS control is started for the wheel on the high μ-road together with the pressure decreasing control for the wheel on the low μ-road, independently from the slip ratio of the wheel on the high μ-road.

When the condition for starting the ABS control is satisfied, the flag for indicating that the ABS control is in operation is set. The flag is continuously held until the ECU 70 determines that the condition for stopping the ABS control is satisfied. When any one of the control modes is set, the operation corresponding to such selected control mode will be carried out at a step 165 for an output process as explained below. Namely, in the case that the pressure decreasing mode is set, the pressure decreasing operation will be carried out. In the case that the pressure holding mode or the pressure increasing mode is selected, the corresponding pressure holding operation or the pressure increasing operation will be carried out.

In the pressure decreasing operation, the first to fourth pressure increase valves 17, 18, 37, 38 are closed, whereas the first to fourth pressure decrease valves 21, 22, 41, 42 are opened. Then, the electric motor 60 is operated to drive the fluid pumps 19 and 39. As a result, the brake fluid is respectively drained to the first and second reservoirs 20 and 40 from the fluid passages A and E between the pressure increase valves 17, 18, 37, 38 and the wheel cylinders 14, 15, 34, 35. The brake fluid sucked by the fluid pumps 19 and 39 are pumped out and returned to the main fluid passages A and E between the pressure increase valves 14, 15, 37, 38 and the master cylinder 13. As above, the W/C pressure at the respective wheel cylinders 14, 15, 34, 35 is decreased.

In the pressure holding operation, not only the pressure increase valves 17, 18, 37, 38 but also the pressure decrease valves 21, 22, 41, 42 are closed, so that the W/C pressure of the brake fluid at the respective wheel cylinders 14, 15, 34, 35 is held.

In the pressure increasing operation, the supply of the electric power to the pressure increase valves 17, 18, 37, 38 is started to open those valves, whereas the pressure decrease valves 21, 22, 41, 42 are closed. When the pressure increasing operation is started, a differential pressure is appearing at each of the pressure increase valves 17, 18, 37, 38, wherein the differential pressure is equal to a pressure difference between the upstream and downstream sides of the respective valves at a timing just before starting the pressure increasing operation. Then, the power supply to the solenoids of the respective pressure increase valves 17, 18, 37, 38 is controlled, so that the differential pressure is gradually reduced. As a result, the differential pressure between the W/C pressure at the wheel cylinders 14, 15, 34, 35 (which are located at the downstream sides of the pressure increase valves 17, 18, 37, 38) and the higher fluid pressure at the upstream sides of the pressure increase valves 17, 18, 37, 38 (that is the M/C pressure) becomes smaller. As above, the W/C pressure at the wheel cylinders 14, 15, 34, 35 is increased.

The process further goes to a step 130, at which the ECU 70 determines whether the road is in the μ-split condition. The determination at the step 130 is made based on the determination at the step 120 (the determination for the μ-split road). Namely, in the case that the determination at the step 325 or 335 is "in the μ-split condition", the determination at the step 130 is YES. In the case that the determination at the step 305 is "not in the μ-split condition", the determination at the step 130 is NO.

When the road is not in the μ-split condition (that is, NO at the step 130), the process goes to a step 135, at which an independent ABS control is carried out for the respective wheels FL-RR. In other words, a normal ABS operation, which is carried out for the road not in the μ-split condition, is independently carried out for each of the wheels FL-RR.

When the road is in the μ-split condition (that is, YES at the step 130), the process goes to a step 140, at which the ECU 70 determines whether the operation for the ABS control is carried out for the front wheel FL or FR. In the case that the ABS control is operated for the front wheel FL or FR (YES at the step 140), the process goes to a step 145. On the other hand, in the case that the ABS control is not operated for the front wheel FL or FR (NO at the step 140), the process goes to the step 135, so that the independent ABS control is carried out.

At the step 145, the ECU 70 determines whether the operation for the ABS control is carried out for the front right wheel FR. In case of YES, the process goes to a step 150, at which the ECU 70 determines whether the road for the right-hand side wheels is the high μ-road. In case of NO at the step 145, namely when the operation for the ABS control is carried out for the front left wheel FL, the process goes to a step 155, at which the ECU 70 determines whether the road for the left-hand side wheels is the high μ-road.

In case of YES at the step 150 or 155, the process goes to a step 160, at which a yaw control is further carried out during the operation of the ABS control for the wheel which is on the high μ-road. In case of NO at the step 150 or 155, the process goes to the step 135, so that the independent ABS control is carried out for the wheel which is not on the high μ-road.

The yaw control is carried out for the purpose of suppressing the braking force for the wheel on the high μ-road from getting away from the braking force for the wheel on the low μ-road, in particular for the purpose of preventing a difference between the braking forces for the wheels on the high μ-road and on the low μ-road from becoming larger as a result of rapid pressure increase for the wheel on the high μ-road. More exactly, relationships between operating conditions for the subject wheel for the yaw control and the opposite wheel in the horizontal direction and the control modes (the pressure decreasing mode, the pressure holding mode, the pressure increasing mode) to be carried out for the subject wheel are decided in advance. And the control mode (that is, one of the modes for the pressure decreasing, the pressure holding and the pressure increasing) is selected, based on the above relationships, in accordance with the operating conditions for the subject wheel for the yaw control and the opposite wheel in the horizontal direction.

FIG. 6 is a flowchart showing processes for the yaw control. At first, at a step 400, the ECU 70 determines whether a small slip is generated or not. The small slip here means a slip, which exceeds a threshold value smaller than that used for determining whether the condition for starting the ABS control is satisfied or not. Therefore, the ECU 70 determines that the small slip is generated when the slip ratio (which is expressed as a variation between the estimated vehicle speed and the actual wheel speed) exceeds the threshold value. Then, the process goes to a step 405, at which a moderate pressure decreasing control is carried out.

The moderate pressure decreasing control is a pressure decreasing control for which a pressure decreasing time period is shortened. In other words, the pressure decreasing operation is carried out for such shortened time period. The driving currents to the solenoids of the pressure increase valves 17, 18, 37, 38 and the pressure decrease valves 21, 22, 41, 42 are calculated so as to carry out the moderate pressure decreasing control. As a result of the moderate pressure decreasing control, it becomes possible to decrease the W/C pressure of the wheel FR or FL which is on the high μ-road, when the small slip is generated. Therefore, it is possible to decrease the slip of the wheel on the high μ-road. Then, the process goes to a step 470.

In case of NO at the step 400, that is, when the small slip is not generated, the process goes to a step 410, at which the ECU 70 determines whether a symmetrical wheel is in the pressure decreasing mode or not. The symmetrical wheel here is a wheel on an opposite side to the wheel for which the yaw control is carried out. In other words, when the yaw control is carried out for the front right wheel FR, the symmetrical wheel is the front left wheel FL, and vice versa.

In case of YES at the step 410, namely when the symmetrical wheel is in the pressure decreasing mode, the process goes to a step 415, at which the pressure holding control is carried out for the wheel on the high μ-road. The driving currents for the solenoids of the pressure increase valves 17, 18, 37, 38 and the pressure decrease valves 21, 22, 41, 42 are calculated so as to carry out the pressure holding control.

If the pressure increasing control was carried out for the wheel (FR or FL) on the high μ-road even when the symmetrical wheel is in the pressure decreasing mode, the difference of the W/C pressure between the front right wheel FR and the front left wheel FL would become too large and thereby the vehicle is likely to become unstable. Therefore, when the symmetrical wheel is in the pressure decreasing mode, the pressure holding control is carried out for the wheel on the high μ-road, in order to prevent the difference of the W/C pressure between the front right and front left wheels FR and FL from becoming too large. Then, the process goes to the step 470.

In case of NO at the step 410, namely when the symmetrical wheel is not in the pressure decreasing mode, the process goes to a step 420, at which the ECU 70 determines whether an absolute figure for a difference of the estimated W/C pressure "PWC" between the front right and front left wheels FR and FL exceeds a threshold value "Phold" (for example, 1 to 5 MPa) or not. In the case that the absolute figure for the difference of the estimated W/C pressure "PWC" between the front right and front left wheels FR and FL does not exceed the threshold value "Phold", the difference of the estimated W/C pressure "PWC" can be regarded as not being large. On the other hand, in the case that the absolute figure exceeds the threshold value "Phold", the difference of the estimated W/C pressure "PWC" can be regarded as being large.

Therefore, in case of YES at the step 420, the process goes to the step 415, at which the pressure holding control is carried out for the wheel on the high μ-road, as explained above. As a result, it is possible to prevent the difference of the estimated W/C pressure "PWC" between the front right and front left wheels FR and FL from becoming too large.

So long as the determination at the step 420 is NO, the process goes to a step 425, at which a moderate pressure increasing control is carried out for the wheel on the high μ-road. The driving currents for the solenoids of the pressure increase valves 17, 18, 37, 38 and the pressure decrease valves 21, 22, 41, 42 are calculated so as to carry out the moderate pressure increasing control.

The moderate pressure increasing control is a pressure increasing control, according to which the W/C pressure for the wheel on the high μ-road is gradually increased with a pressure increase slope of a relatively moderate curve.

The moderate pressure increasing control is carried out by controlling the opening and closing of the pressure increase valves and the pressure decrease valves, as in the same manner to the regular pressure increasing control. However, current supply amount to the solenoids of the pressure increase valves 17, 18, 37, 38 is gradually increased.

According to the present embodiment, during the moderate pressure increasing control, a demand differential pressure to be generated between the upstream and downstream sides of the pressure increase valve 17 or 37 (which corresponds to the front wheel FL or FR on the high μ-road) is alternately set at a target value for the differential pressure (a first target pressure) "Plow" and another target value for the differential pressure (a second target pressure) "Phigh" for respective short time periods. The first target pressure "Plow" is a relatively low value and the second target pressure "Phigh" is higher than the first target pressure "Plow". More exactly, the demand differential pressure is set and kept at the first target pressure "Plow" for a first time period "Tlow", and thereafter the demand differential pressure is changed to the second target pressure "Phigh" which is kept for a second time period "Thigh". And the above change for the demand differential pressure from the first target pressure to the second target pressure is repeated. The driving current to the solenoids of the pressure increase valves is made in a pulse shape to achieve such moderate pressure increasing control.

The first target pressure "Plow" corresponds to such a value of "zero", which is obtained when the pressure increase valve 17 or 37 corresponding to the front wheel FL or FR on the high μ-road is opened, or a value slightly larger than "zero". The current supply amount to the solenoid of the pressure increase valve 17 or 37 (for the front wheel FL or FR on the high μ-road) is controlled to be a minimum value (that is, zero) or a value slightly higher than the minimum value, in order to generate the first target pressure "Plow".

In the case that the first time period "Tlow" was set at a longer period beyond the limit, the W/C pressure would be excessively increased, on one hand. On the other hand, in the case that the first time period "Tlow" was set at a shorter period beyond the limit, the W/C pressure would not be sufficiently increased. Therefore, the first time period "Tlow" is decided depending on a desired increasing slope for the moderate pressure increasing control. For example, the first target pressure "Plow" is set at 2 MPa, and the first time period "Tlow" is set at 12 ms.

The second target pressure "Phigh" corresponds to such a value, which is obtained when the pressure increase valve 17 or 37 corresponding to the front wheel FL or FR on the high μ-road is closed, or a value slightly smaller than such value at a valve closed condition. The current supply amount to the solenoid of the pressure increase valve 17 or 37 (for the front wheel FL or FR on the high μ-road) is controlled to be a maximum value (that is, a value for closing the pressure increase valve 17 or 37) or a value slightly lower than the maximum value, in order to generate the second target pressure "Phigh".

In the case that the second time period "Thigh" was set at a longer period beyond the limit, the pressure increase for the W/C pressure would be excessively delayed, on one hand. On the other hand, in the case that the second time period "Thigh" was set at a shorter period beyond the limit, the W/C pressure would be excessively increased. Therefore, the second time period "Thigh" is decided depending on the desired increasing slope for the moderate pressure increasing control. For example, the second target pressure "Phigh" is set at 25 MPa, and the second time period "Thigh" is set at 60 ms.

As above, the differential pressure for the subject pressure increase valve 17 or 37 (which corresponds to the front wheel FL or FR on the high μ-road) is controlled by repeating the operation, according to which the differential pressure is controlled at the first target pressure "Plow" for the first time period "Tlow" and then at the second target pressure "Phigh" for the second time period "Thigh", so that the moderate pressure increasing control is carried out.

During the above moderate pressure increasing control, a deviation of an actual pressure increase slope from a desired pressure increase slope can be made smaller by way of alternately carrying out the pressure increasing control at the first target pressure "Plow" and the pressure increasing control at the second target pressure "Phigh".

Namely, during the above moderate pressure increasing control, the actual differential pressure generated at the subject pressure increase valve 17 or 37 may deviate from the demand differential pressure due to individual difference of the pressure increase valve 17 or 37, even when the first target pressure "Plow" is set at a constant value and the first and second target pressures "Plow" and "Phigh" are alternately changed. In the case that the deviation of the actual differential pressure is on a side, in which the differential pressure becomes larger, it would be possible to keep the pressure increase slope at a larger value to a certain extent. On the other hand, in the case that the deviation of the actual differential pressure is on an opposite side, in which the differential pressure becomes smaller, it would be possible to suppress a rapid pressure increase.

However, in a range in which a difference between the actual M/C pressure and the actual W/C pressure is equal to or smaller than a deviating amount of a characteristic for the differential pressure, the differential pressure may inevitably remain due to the deviation of the differential pressure caused by the individual difference of the pressure increase valves 17 and 37. As a result, it would become difficult to increase the W/C pressure. Therefore, it would be desired to take countermeasures for such problem.

According to the embodiment, therefore, the first target pressure "Plow" is not set at a constant value, but gradually changed to a smaller value in a stepwise manner.

The second target pressure "Phigh" is set at such a value, which is sufficiently large (at an initial stage of the moderate pressure increasing operation) to maintain the differential pressure between the upstream and the downstream sides of the pressure increase valve 17 or 37. However, as the moderate pressure increasing operation is proceeded, the actual differential pressure at the pressure increase valve 17 or 37 between the upstream and the downstream sides is decreased.

The second target pressure "Phigh" is one of the target pressures between the first and second target pressures "Plow" and "Phigh" and the second target pressure "Phigh" is larger than the other (the first target pressure "Plow"). Therefore, as the second target pressure "Phigh" would become larger, the actual differential pressure between the W/C pressure and the M/C pressure would become correspondingly larger. As a result, the pressure value of a horizontal portion for the W/C pressure in FIG. 11 would become lower.

When the second target pressure "Phigh" is set at a constant value, the W/C pressure would gradually become closer to the M/C pressure as a result that the pressure increase slope for the moderate pressure increasing operation is carried out based on the value for the first target pressure "Plow". However, in the case that the second target pressure "Phigh" (the actual pressure "Phigh" based on a deviation of IP characteristic, explained below with reference to FIG. 13) was maintained at the larger value, it would be difficult to bring the W/C pressure sufficiently closer to the M/C pressure, even if the target pressures are alternately changed between the first target pressure "Plow" and the second target pressure "Phigh". Therefore, according to the embodiment, the second target pressure "Phigh" is not set at a constant value, but gradually decreased in a stepwise manner.

When the W/C pressure is coming closer to the M/C pressure, the differential pressure at the pressure increase valve 17 or 37 (between the upstream and downstream sides) becomes smaller. It is, therefore, difficult to bring the W/C pressure to the M/C pressure when the pressure control operation is simply carried out at the first target pressure "Plow" only for the period of the first time period "Tlow".

On the other hand, when the W/C pressure is likewise coming closer to the M/C pressure, it is not necessary to surely keep the differential pressure at the pressure increase valve 17 or 37 (between the upstream and downstream sides) at the second target pressure "Phigh". This is because the W/C pressure may not be rapidly increased, when the differential pressure at the pressure increase valve 17 or 37 (between the upstream and downstream sides) is decreasing.

When a difference between the first target pressure "Plow" and the second target pressure "Phigh" is controlled to gradually become smaller, so that the second target pressure "Phigh" comes closer to the first target pressure "Plow", the W/C pressure is gradually increased even during the period in which the pressure control operation is carried out at the second target pressure "Phigh" As a result, the W/C pressure is controlled to come closer to the M/C pressure in an earlier stage.

In order to realize the above operation, the processes at a step 430 and its subsequent steps will be carried out. At the step 430, the ECU 70 determines whether an output condition is in a condition of outputting the second target pressure "Phigh", in other words, whether the demand differential pressure at the pressure increase valve 17 or 37 corresponding to the front wheel FL or FR on the high µ-road is set at the second target pressure "Phigh". As explained below, the respective output conditions are indicated in the following steps 455, 445, and 475. Therefore, the step 430 is carried out by confirming the indicated output condition at the step 455, 445 or 475.

In case of NO at the step 430, the process goes to a step 435, at which the ECU 70 determines whether a time period in which the demand differential pressure is set at the first target pressure "Plow" has passed over the first time period "Tlow". For example, the process of the step 435 is carried out by a counter (not shown), which starts its counting operation when the demand differential pressure is set at the first target pressure "Plow" for the first time. And the determination is made YES at the step 435, when a counting amount of the counter reaches at a value corresponding to the first time period "Tlow".

In case of NO at the step 435, the process goes to a step 440, at which the demand differential pressure is set at the first target pressure "Plow". The first target pressure "Plow" is kept as the demand differential pressure until the time passes over the first time period "Tlow". The calculation for the first target pressure "Plow" at the step 440 is carried out based on a pulse number set by a step 465 (explained below). When the calculation for the first target pressure "Plow" is carried out for the first time, the pulse number is zero. Therefore, the first target pressure "Plow" for the demand differential pressure is calculated (set) as "Plow(initial)".

Then, the process goes to a step 445, at which the ECU 70 indicates the output condition, which is not in a condition of outputting the second target pressure "Phigh". For example, the output condition is indicated by a flag when the second target pressure "Phigh" is being outputted. When the flag is reset, the output condition (in which the second target pressure "Phigh" is not being outputted) is indicated. When the processes of FIG. 6 are terminated after the step 445, then the processes for the yaw control will be repeated from the step 400. In other words, the processes from the step 435 to the step 445 are repeated, until the time period in which the demand differential pressure is set at the first target pressure "Plow" passes over the first time period "Tlow".

The determination at the step 435 becomes YES, when the time period in which the demand differential pressure is set at the first target pressure "Plow" has passed over the first time period "Tlow". Then, the process goes to a step 450, at which the demand differential pressure is changed from the first target pressure "Plow" to the second target pressure "Phigh". The calculation for the second target pressure "Phigh" is carried out in accordance with a formula shown in the step 450 based on the pulse number set by the step 465 (explained below). When the calculation for the second target pressure "Phigh" is carried out for the first time, the pulse number is zero. Therefore, the second target pressure "Phigh" for the demand differential pressure is calculated (set) as "Phigh (initial)". Then, the process goes to a step 455, at which the ECU 70 indicates the output condition, which is in a condition for outputting the second target pressure "Phigh". For example, the output condition is indicated by the flag when the second target pressure "Phigh" is being outputted. When the processes of FIG. 6 are terminated after the step 455, then the processes for the yaw control will be repeated from the step 400.

As above, when the output condition is set at the condition for outputting the second target pressure "Phigh" at the step 455, and when the processes for the yaw control of FIG. 6 are repeated, the determination at the step 430 becomes YES. Then, the process goes to a step 460, at which the ECU 70 determines whether a time period in which the demand differential pressure is set at the second target pressure "Phigh" has passed over the second time period "Thigh". For example, the process of the step 460 may be carried out in a similar way to that of the step 435. Namely, the process of the step 460 may be carried out by a counter (not shown), which starts its counting operation when the demand differential pressure is set at the second target pressure "Phigh" for the first time. And the determination is made YES at the step 460, when a counting amount of the counter reaches at a value corresponding to the second time period "Thigh".

In case of NO at the step 460, the processes of the steps 450 and 455 are carried out, and the yaw control (the steps 450 and 455) will be repeated until the time period in which the demand differential pressure is set at the second target pressure "Phigh" passes over the second time period "Thigh".

The determination at the step 460 becomes YES, when the time period in which the demand differential pressure is set at the second target pressure "Phigh" has passed over the second time period "Thigh". Then, the process goes to the step 465, at which "1" is added to the pulse number. The pulse number indicates a number of processes in which the demand differential pressure is set to the first target pressure "Plow" (the step 440) and the demand differential pressure is set to the second target pressure "Phigh" (the step 450). Namely, the pulse number is incremented by "1", when both of the step 440 and the step 450 are carried out. Then, the process goes to the step 440, at which the demand differential pressure is changed from the second target pressure "Phigh" to the first target pressure "Plow".

The calculation for the first target pressure "Plow" at the step 440 is carried out based on the pulse number set by the step 465. Namely, the calculation is made in a way that a predetermined value (α×pulse number) is subtracted from the first target pressure "Plow (initial)", so that the first target pressure "Plow" is gradually made smaller in a stepwise manner. The predetermined value (α×pulse number) is calculated by multiplying a decremental slope "α" by the pulse number, wherein the decremental slope "α" corresponds to a predetermined first slope.

The decremental slope "α" may be arbitrarily selected. For example, the decremental slope "α" may be set in the following manner, in which deviations included in the pressure increase valves are taken into consideration. It is supposed at first that the demand differential pressure would become zero (0 MPa) at a predetermined pulse number "ppn-1", in which the demand differential pressure would be gradually decreased in a stepwise manner with a maximum deviation. Then, a minimum value "Pmin (1)" for the demand differential pressure at the predetermined pulse number "ppn-1" is calculated, on the assumption that the demand differential pressure would be gradually decreased in the stepwise manner without deviation. As a result, the decremental slope "α" may be obtained between the first target pressure "Plow (initial)" (at the pulse number of zero) and the minimum value "Pmin (1)" at the predetermined pulse number "ppn-1".

When the time period in which the demand differential pressure is set at the first target pressure "Plow" has once again passed over the first time period "Tlow", the determination at the step 435 is YES and the process goes to the step 450, at which the demand differential pressure is again changed from the first target pressure "Plow" to the second target pressure "Phigh".

The calculation for the second target pressure "Phigh" at the step 450 is carried out based on the pulse number set by the step 465, as in a similar manner to the step 440. Namely, the calculation is made in a way that a predetermined value (β×pulse number) is subtracted from the second target pressure "Phigh (initial)", so that the second target pressure "Phigh" is gradually made smaller in a stepwise manner. The predetermined value (β×pulse number) is calculated by multiplying a decremental slope "β" by the pulse number, wherein the decremental slope "β" corresponds to a predetermined second slope.

The decremental slope "β" may be arbitrarily selected. However, the decremental slope "β" has a larger slope than the decremental slope "α". The decremental slope "β" may be obtained in a similar manner to the decremental slope "α". Namely, it is supposed at first that the demand differential pressure would become zero (0 MPa) at a predetermined pulse number "ppn-2", in which the demand differential pressure would be gradually decreased in a stepwise manner with a maximum deviation. Then, a minimum value "Pmin (2)" for the demand differential pressure at the predetermined pulse number "ppn-2" is calculated, on the assumption that the demand differential pressure would be gradually decreased in the stepwise manner without deviation. As a result, the decremental slope "β" may be obtained between the second target pressure "Phigh (initial)" (at the pulse number of zero) and the minimum value "Pmin (2)" at the predetermined pulse number "ppn-2".

As above, the demand differential pressure is alternately changed from the first target pressure "Plow" and the second target pressure "Phigh", and vice versa. In addition, each of the first and second target pressures "Plow" and "Phigh" is gradually reduced to the smaller value in the stepwise manner. The moderate pressure increasing control is carried out in the above manner.

In the case that the moderate pressure decreasing control is carried out at the step 405 and the differential pressure is held at the step 415, the moderate pressure increasing control is not carried out. Therefore, the process goes to the step 470, at which the pulse number is reset to zero. The process further goes to the step 475, at which the flag (for indicating the output condition in which the second target pressure "Phigh" is being outputted) is reset so as to indicate that the second target pressure "Phigh" is not being outputted. Then, the process goes from the step 475 to "RETURN".

In the case that the determination at the step 435 or the step 460 is YES, the counting amount of the counter for counting the first or second time period "Tlow" or "Thigh" is reset to zero. As a result, it is possible to start the counting for the first or second time period "Tlow" or "Thigh" from zero, when the demand differential pressure is set again to the first target pressure "Plow" or to the second target pressure "Phigh".

When the yaw control (the step 160 in FIG. 3) is carried out as above, the process goes to a step 165 in FIG. 3, at which an output process is carried out. Namely, at the step 165, the driving currents are respectively supplied to the solenoids of the pressure increase valves 17, 18, 37, 38 as well as the pressure decrease valves 21, 22, 41, 42, so that the independent control decided at the step 135, and the yaw control (the moderate pressure increasing control, the pressure holding control, the moderate pressure decreasing control) are actually performed.

Effects of the above ABS operation will be explained with reference to the timing chart shown in FIG. 7, which shows speeds and pressures of related portions when the ABS operation is carried out on the μ-split road.

At a time point T1 after having started the braking operation, the condition for starting the ABS operation is satisfied for the wheel on the low μ-road, and the ABS operation starts. Then, the pressure decreasing mode is set for the wheels on the high μ-road as well as the low μ-road according to the select-low control. The W/C pressures for both of the wheels are decreasing as a result of the pressure decreasing operation.

Since there exists little variation between the estimated vehicle speed and the wheel speed for the wheel on the high μ-road, the pressure decreasing mode is released and the pressure increasing mode is set to start the pressure increasing operation at a time point T2. As a result, the difference between the estimated W/C pressure for the wheel on the high μ-road and the estimated W/C pressure for the wheel on the low μ-road will become larger. And the difference exceeds the threshold value "Phold" at a time point T3. At the step 120 (FIG. 3) for the determining the μ-split road, the ECU determines that the wheels are on the μ-split road. At the same time, the ECU determines at the steps 325 and 335 (FIG. 5) which wheel (the front left wheel FL or the front right wheel FR) is on the high μ-road.

When the road condition is determined (the step 120, FIG. 3) as being in the μ-split condition, the yaw control (the step 160, FIG. 3) is carried out for the wheel which is on the high μ-road. In the case that the symmetrical wheel is in the pressure decreasing mode (the step 410, FIG. 6), or in the case that the absolute figure of the difference for the estimated W/C pressures between the front left and front right wheels FL and FR, is larger than the threshold value "Phold" (the step 420, FIG. 6), the W/C pressure for the wheel on the high μ-road is held at the time point T3 (the step 415, FIG. 6). As a result, the braking force is maintained by holding the W/C pressure for the wheel on the high μ-road. In addition, the difference for the W/C pressures between the front left wheel FL (e.g. on the high μ-road) and the front right wheel FR (e.g. on the low μ-road) is suppressed from becoming too large. In other words, a difference of the braking forces between the front left and front right wheels FL and FR is suppressed to a smaller amount.

When the wheel speed for the wheel on the low μ-road comes back, the W/C pressure for such cylinder is held for a certain time period. Then, the pressure increasing mode is set for the wheel on the low μ-road at a time point T4.

As a result, the absolute figure of the difference between the estimated W/C pressures for the front left and front right wheels FL and FR becomes smaller than the threshold value "Phold" at a time point T5. The moderate pressure increasing control is carried out for the wheel on the high μ-road as from the time point T5.

During the moderate pressure increasing control (the steps 430 to 465, FIG. 6), the W/C pressure for the wheel on the high μ-road is gradually increased. Namely, the demand differential pressure for the pressure increase valve 17 or 37 (corresponding to the front left or front right wheel FL or FR on the high μ-road) is set at the first target pressure "Plow" for the first time period "Tlow" and then the demand differential pressure is changed to the second target pressure "Phigh" for the second time period "Thigh". And the above operation is repeated. Accordingly, the demand differential pressure (and the driving current) for the pressure increase valve 17 or 37 (corresponding to the front left or front right wheel FL or FR on the high μ-road) is gradually made smaller in a pulse-shape manner (that is, in the stepwise manner).

Therefore, even in the case that the deviation of the actual differential pressure at the pressure increase valve 17 or 37 with respect to the demand differential pressure would be moved to the side, in which the differential pressure becomes larger, it would be possible to suppress a rapid pressure increase. On the other hand, even in the case that the deviation of the actual differential pressure would be moved to the opposite side, in which the differential pressure becomes smaller, it would be possible to achieve the pressure increase to a certain extent.

As already explained above, each of the first and second target pressures "Plow" and "Phigh" is not set at the constant value but is gradually made smaller in the stepwise manner. As a result, the difference between the M/C pressure and the W/C pressure becomes smaller, as the time goes by. In other words, in the case that the M/C pressure is maintained at a constant value, the W/C pressure is gradually increased, as the time goes by. Accordingly, it is possible to make smaller the deviation of the differential pressures which would be caused by the individual difference for the pressure increase valve 17 or 37, during the moderate pressure increasing operation.

In addition, since the decremental slope "β" for the second target pressure "Phigh" is made larger than the decremental slope "α" for the first target pressure "Plow", a difference between the first and second target pressures "Plow" and "Phigh" is gradually made smaller. In other words, the second target pressure "Phigh" is controlled to become closer to the first target pressure "Plow". As a result, when the W/C pressure for the front wheel (one of the front wheels FL and FR) on the high μ-road is coming closer to the M/C pressure, it would be possible to gradually increase the W/C pressure, even in the case that the demand differential pressure at the pressure increase valve 17 or 37 is set at the second target pressure "Phigh". Thus, the W/C pressure for the wheel on the high μ-road can be controlled to become close to the M/C pressure in the earlier stage.

A fundamental principle for the above effects will be explained with reference to FIGS. 8 to 11.

Figure 8:
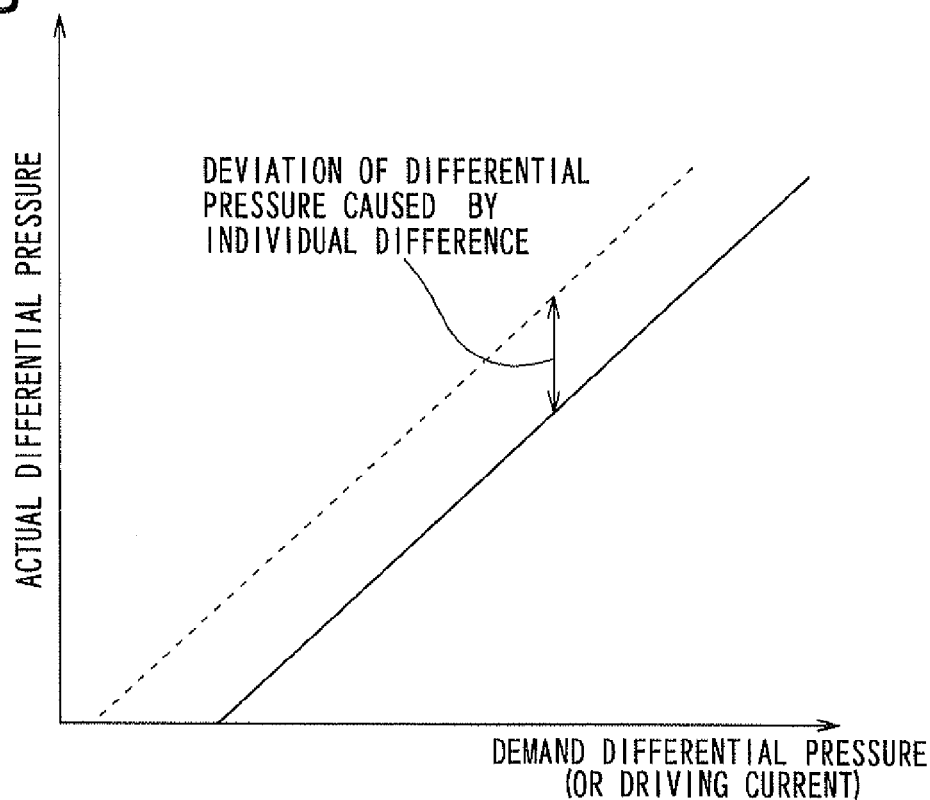
FIG. 8 is a graph showing characteristic lines of a differential pressure with respect to a demand differential pressure or a driving current, wherein the differential pressure is influenced by individual difference of pressure increase valves (17 and 37)
Figure 9:
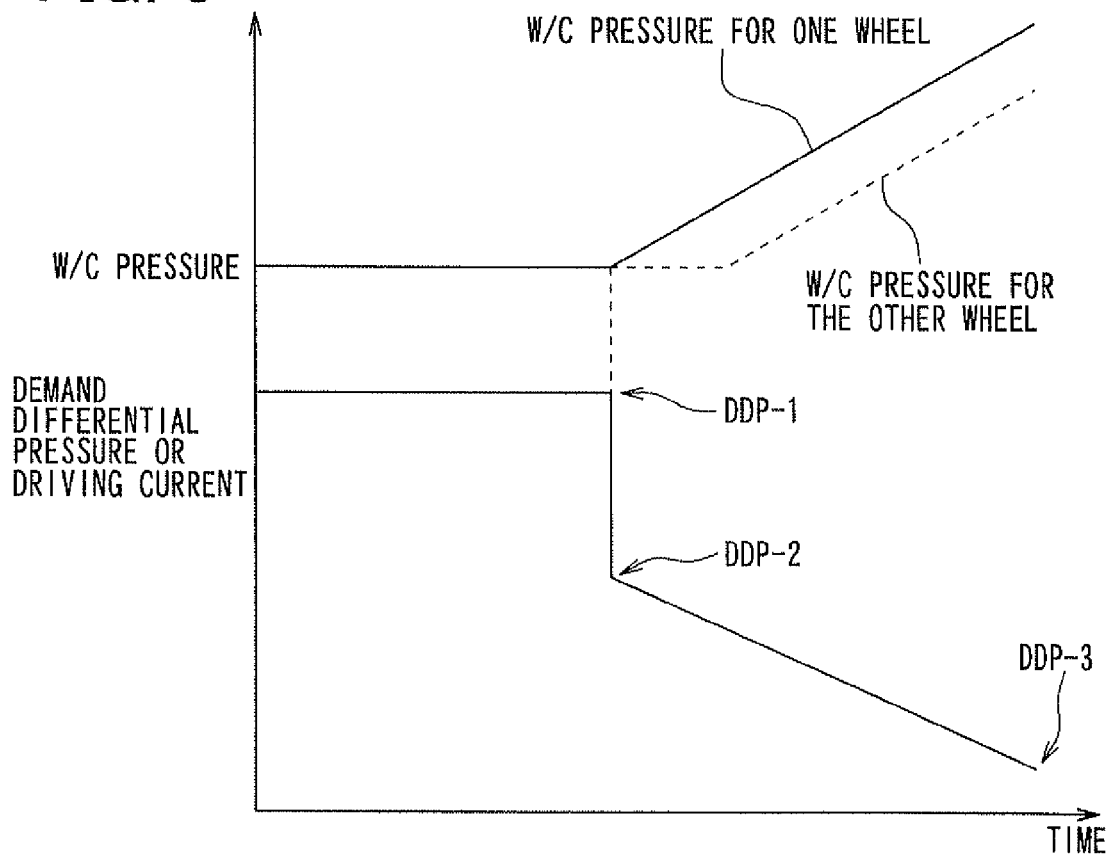
FIG. 9 is a graph showing wheel cylinder pressure for front wheels (FL and FR) when the demand differential pressure (or the driving current) for the pressure increase valves (17 and 37) is gradually and linearly decreased.

FIG. 8 is a graph showing characteristic lines of the differential pressures, which are influenced by the individual differences of the pressure increase valves 17 and 37, with respect to the demand differential pressure (or the driving current). FIG. 9 is a graph showing the W/C pressure for the front wheel FL or FR, when the demand differential pressure (or the driving current) for the pressure increase valve 17 or 37 is gradually and linearly decreased, in the case that the pressure increase valves 17 and 37 have the individual differences as indicated in FIG. 8.

As shown in FIG. 8, the characteristics of the differential pressures actually generated at the pressure increase valve 17 and 37 may be deviated due to the individual difference with respect to the demand differential pressure or the driving current. For example, a solid line is a characteristic for one of the pressure increase valves 17 and 37, while a dotted line is a characteristic for the other pressure increase valve 17 or 37. In this case, there occurs deviations in the actually generated differential pressures, even when the demand differential pressure or the driving current is the same to each other. As a result, in the case that the demand differential pressure or the driving current for the pressure increase valves 17 and 37 is gradually and linearly decreased, as shown in FIG. 9, the W/C pressure for one of the wheels is gradually increased in accordance with the decrease of the demand differential pressure (the solid line), while the W/C pressure for the other wheel is gradually increased with a delay caused by the individual difference (the dotted line).

As above, the difference between the W/C pressures would be always caused by the individual differences, when the demand differential pressure or the driving current is gradually decreased. When the pressure control is changed from the pressure decreasing control to the pressure increasing control, the demand differential pressure for the pressure increase valve 17 or 37 is instantaneously decreased from a first value "DDP-1" (which corresponds to a maximum value for the differential pressure generated when the pressure increase valve 17 or 37 is closed) to a second value "DDP-2". The second value "DDP-2" corresponds to a difference between the M/C pressure and the W/C pressure, which is actually generated when the pressure control is changed from the pressure decreasing control to the pressure increasing control. Then, the demand differential pressure is gradually and linearly decreased toward a third value "DDP-3".

The differential pressures between the M/C pressure and the W/C pressure, which are actually being generated when the pressure control is changed from the pressure decreasing control to the pressure increasing control, would be different from each other, in the case that the individual differences are existing between the pressure increase valves 17 and 37. According to the embodiment, however, the estimated W/C pressures are calculated without taking such individual differences into consideration, and the differential pressures between the M/C pressure and the W/C pressure are calculated based on such estimated W/C pressures. As a result, when the pressure control is changed from the pressure decreasing control to the pressure increasing control, the second value "DDP-2" for the demand differential pressure or the driving current may not be always equal to such a value, for which the individual differences are taken into consideration.

As shown by the solid line for the W/C pressure in FIG. 9, the W/C pressure may be increased immediately when the pressure control is changed from the pressure decreasing control to the pressure increasing control. This is because the second value "DDP-2" for the demand differential pressure or the driving current corresponds to the actually generated differential pressure between the M/C pressure and the W/C pressure. However, as shown by the dotted line in FIG. 9, the W/C pressure for the other wheel may be increased not instantaneously but with a delay. This is because the second value "DDP-2" for the demand differential pressure or the driving current does not correspond to the actually generated differential pressure between the M/C pressure and the W/C pressure, due to the individual differences for the pressure increase valves 17 and 37.

When there is a difference between timings for increasing the W/C pressures, due to the individual differences between the pressure increase valves 17 and 37, as shown in FIG. 9, the difference of the W/C pressures between the front left and front right wheels FL and FR would become larger.

According to the present embodiment, however, the demand differential pressure is alternately changed from the first target pressure "Plow" to the second target pressure "Phigh", and vice versa.

Figure 10:
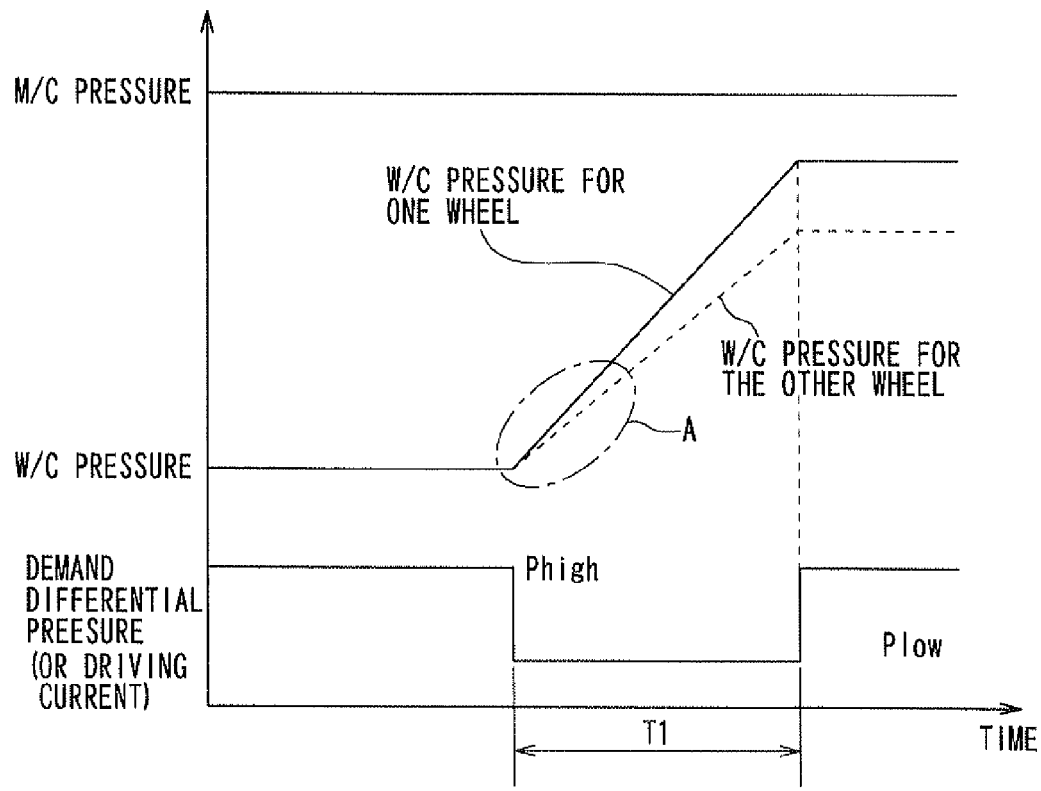
FIG. 10 is a graph showing the wheel cylinder pressure for the front wheels (FL and FR) when the demand differential pressure is changed to a first target pressure "Plow", after the wheel cylinder pressures for both of the front wheels (FL and FR) are decreased to a predetermined value during a period that the demand differential pressure is set at the second target pressure "Phigh"

FIG. 10 is a graph showing the W/C pressures for the front left and front right wheels FL and FR, wherein the W/C pressures are increased when the demand differential pressure is changed from the second target pressure "Phigh" to the first target pressure "Plow" for a time period "T1", after the W/C pressures for both of the front left and front right wheels FL and FR have been decreased to a predetermined pressure in the pressure control in which the demand differential pressure is set at the second target pressure "Phigh". In FIG. 10, the pressure increase valves 17 and 37 have the individual differences as shown in FIG. 8.

Figure 11:
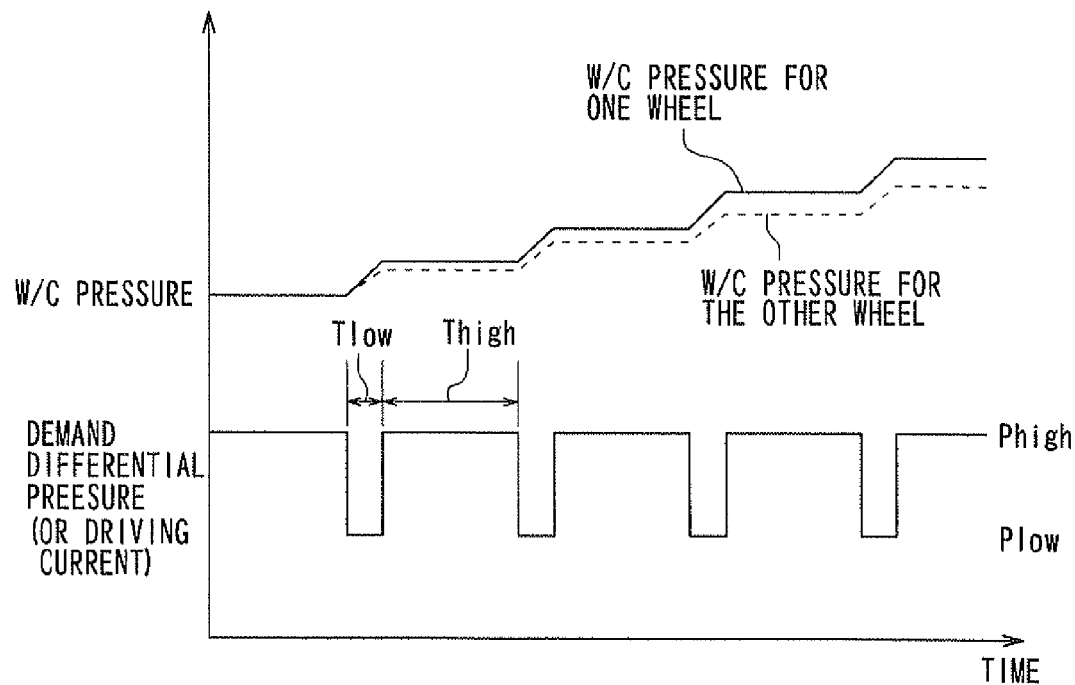
FIG. 11 is a graph showing the wheel cylinder pressures for the front wheels (FL and FR) when the demand differential pressure is alternately changed between the first and second target pressures "Plow" and "Phigh"

FIG. 11 is a graph showing the W/C pressures for the front left and front right wheels FL and FR, wherein the demand differential pressure is alternately changed between the first and second target pressures "Plow" and "Phigh", as in a manner of the present embodiment. In FIG. 11, the pressure increase valves 17 and 37 have likewise the individual differences as shown in FIG. 8.

A deviation is generated between the actual differential pressures at the respective pressure increase valves 17 and 37 (between the upstream and downstream sides thereof) after the time period T1, when the demand differential pressure is changed from the second target pressure "Phigh" to the first target pressure "Plow". And thereby a deviation is generated between the pressure increasing slopes of the W/C pressures for the front left and front right wheels, as shown in FIG. 10. This is because there are individual differences between the pressure increase valves 17 and 37. The deviation generated between the actual differential pressures at the respective pressure increase valves 17 and 37 becomes larger depending on the elapsed time from the time point, at which the demand differential pressure is changed from the second target pressure "Phigh" to the first target pressure "Plow". Therefore, the deviation would not become too large, if the elapsed time is relatively short.

According to the present embodiment, the demand differential pressure is alternately changed for short periods from the first target pressure "Plow" to the second target pressure "Phigh" and vice versa. Therefore, the pressure control operation as encircled by a one-dot-chain line A in FIG. 10 (in which the demand differential pressure is set at the first target pressure "Plow" for a shorter period) is repeatedly carried out. The difference between the W/C pressures for the pressure increase valves 17 and 37, which would be generated due to the individual differences, would not become too large.

As shown in FIG. 11, when the demand differential pressure is alternately changed for the short periods from the first target pressure "Plow" to the second target pressure "Phigh" and vice versa, the W/C pressures for the front left and front right wheels FL and FR are increased together each time when the demand differential pressure is changed to the first target pressure "Plow". In this operation, the deviation is generated between the pressure increasing slopes, as shown in FIG. 10, due to the individual differences between the pressure increase valves 17 and 37. However, the first time period "Tlow" (from the time point at which the demand differential pressure is changed to the first target pressure "Plow" to the time point at which the demand differential pressure is changed to the second target pressure "Phigh") is short. When compared with the case, in which the demand differential pressure (or the driving current) is controlled not in a pulse-shape manner but linearly as shown in FIG. 10, the difference (the deviation) between the W/C pressures may not become larger according to the present invention, as shown in FIG. 11.

As a result, even when the difference (deviation) is generated between the W/C pressures due to the individual differences between the pressure increase valves 17 and 37, such difference (deviation) can be controlled at a smaller amount.

As already explained above with reference to FIG. 9, when the pressure control is changed from the pressure decreasing control to the pressure increasing control, the demand differential pressure is changed to the second value "DDP-2", which corresponds to the difference between the M/C pressure and the W/C pressure. And it may happen, due to the individual differences between the pressure increase valves 17 and 37, that the W/C pressure for either one of the wheels (FL or FR) may not be instantaneously increased. According to the present embodiment, however, since the demand differential pressure is decreased to the small value (the first target pressure "Plow"), it becomes possible to avoid such a case in which the W/C pressure may not be instantaneously increased. At the same time, it is also possible, according to the present embodiment, to carry out the pressure increase to a certain extent. In addition, although the demand differential pressure is decreased to the small value (the first target pressure "Plow"), the rapid increase of the W/C pressure can be suppressed, because the demand differential pressure is changed to the second target pressure "Phigh" after the short time period.

As is also explained above, in the case that the first and second target pressures "Plow" and "Phigh", which are set as the demand differential pressures for the pressure increase valve 17 or 37 corresponding to the front left or front right wheel FL or FR on the high μ-road, were fixed to the constant values, it would be difficult to sufficiently reduce the deviations for the differential pressures generated by the individual differences. Therefore, as shown in FIG. 7, the first and second target pressures "Plow" and "Phigh" are not fixed to the constant values but controlled to gradually become smaller in the stepwise manner. The effects for this operation will be explained more in detail with reference to FIGS. 12 and 13.

Figure 7:
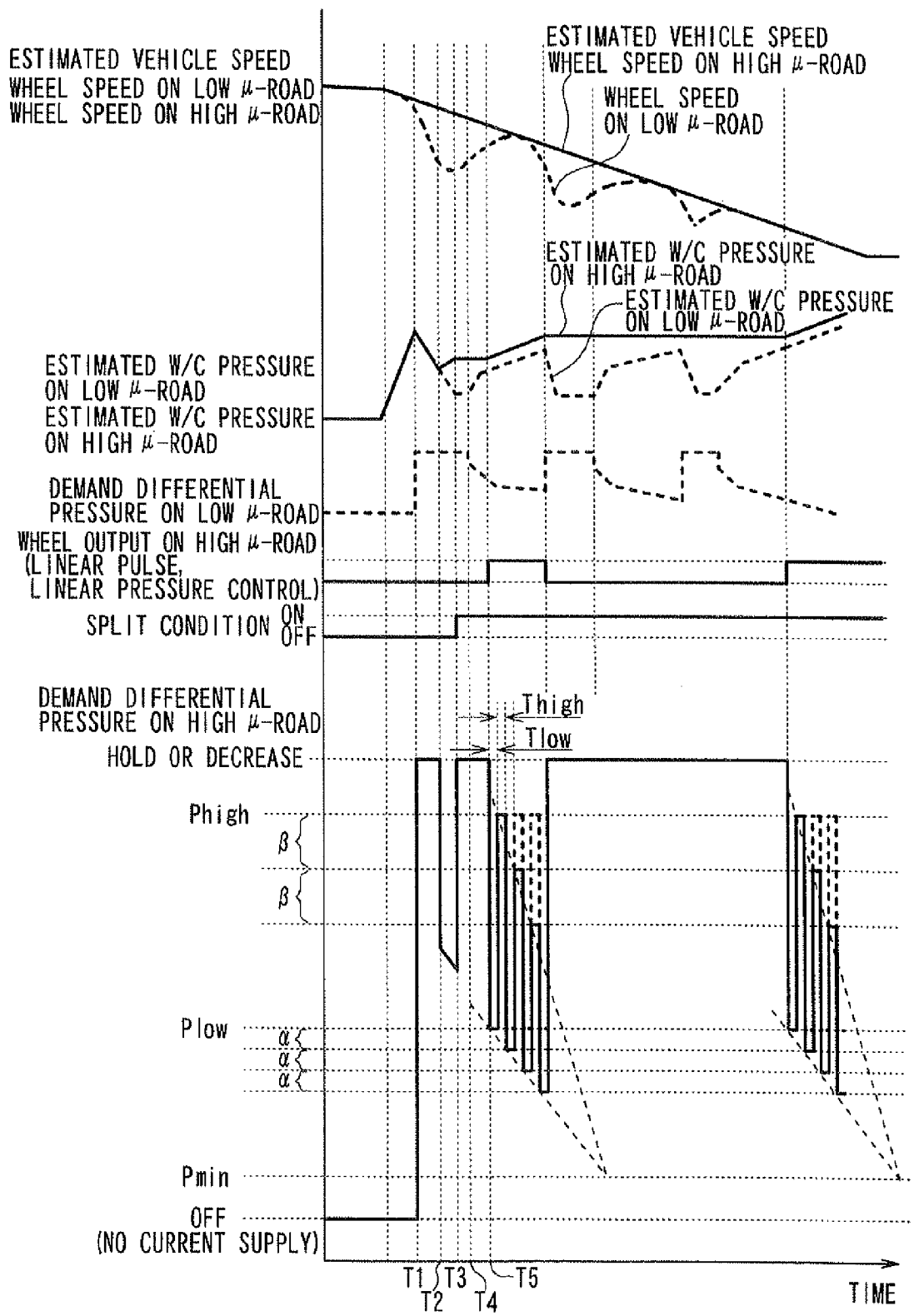
FIG. 7 is a timing chart showing speeds and pressures of related portions, when the ABS operation is carried out on the μ-split road.
Figure 12:
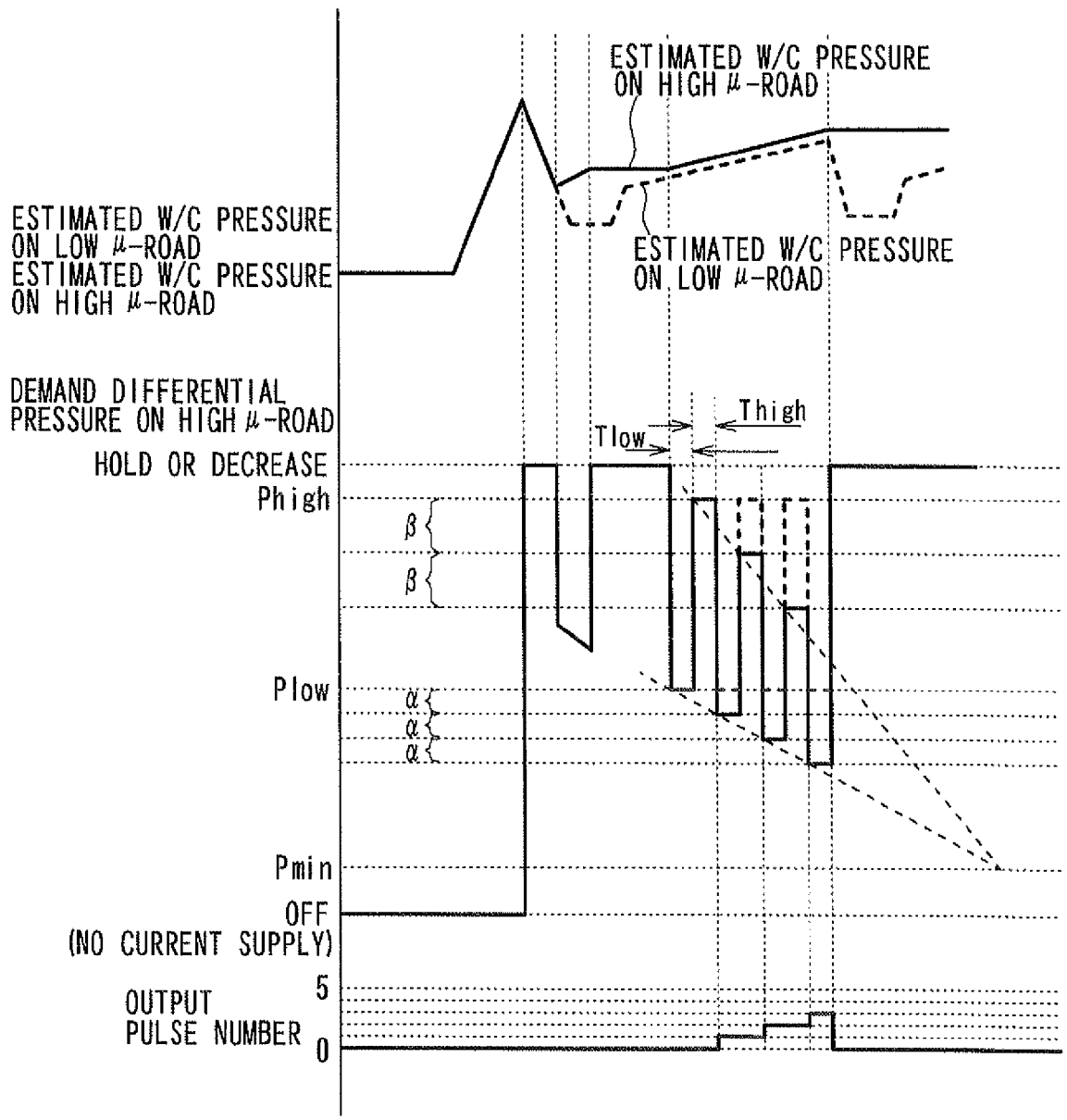
FIG. 12 is an enlarged timing chart showing a part of the timing chart shown in FIG. 7.
Figure 13:
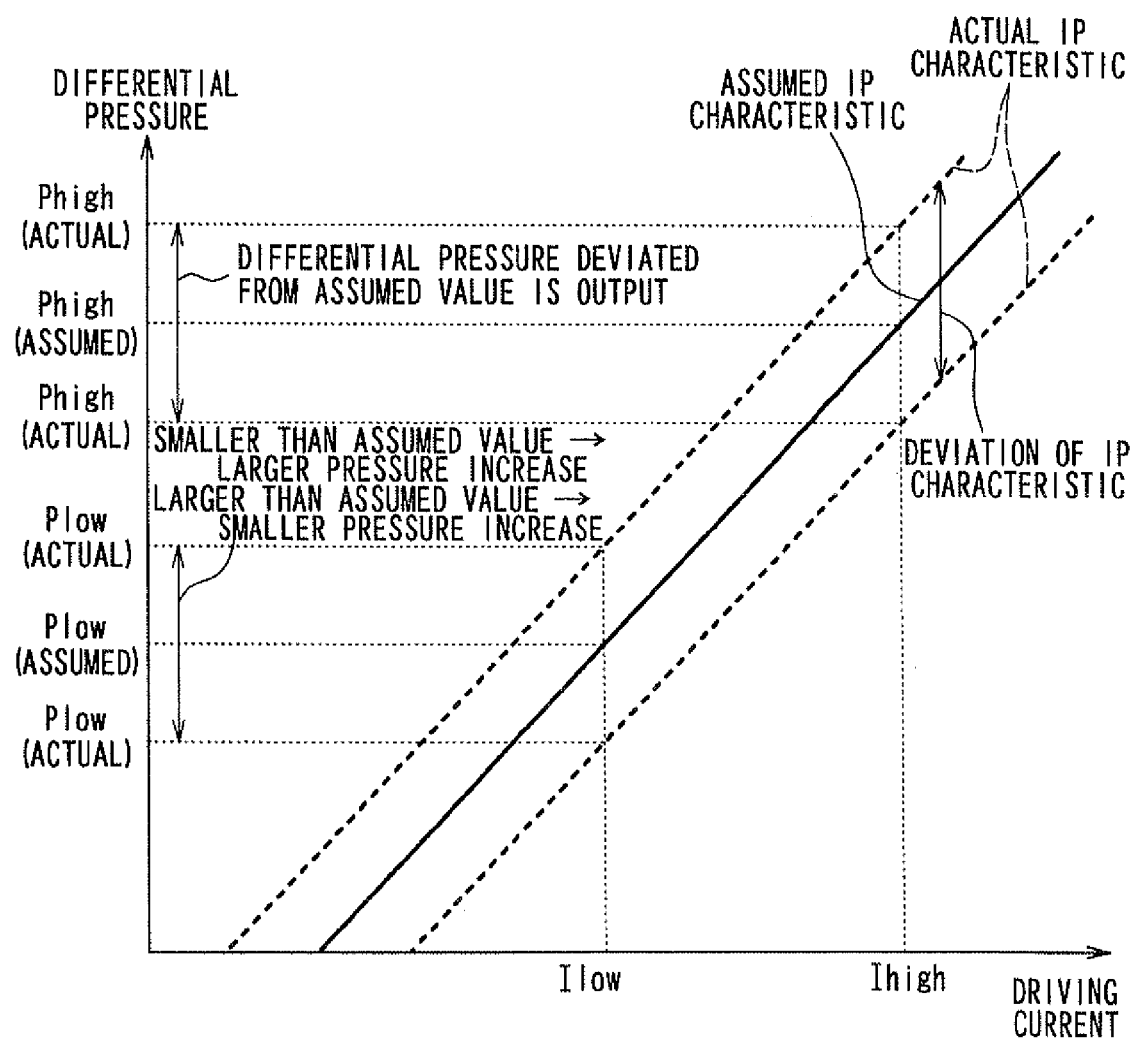
FIG. 13 is a graph showing IP characteristics, which are relationships between the driving current and differential pressure actually generated at the pressure increase valves (17 and 37)

FIG. 12 is an enlarged timing chart showing a part of the timing chart of FIG. 7. FIG. 13 is a graph showing IP characteristic, which is relationship between the driving current (which is calculated from the demand differential pressure based on a map prepared in advance, and which is applied to the pressure increase valve 17 or 37) and the differential pressures generated at the pressure increase valve 17 or 37. A solid line shows an assumed IP characteristic, while a dotted line shows an example of an actual IP characteristic which is inherent in the pressure increase valve.

The driving current "Ilow" corresponds to the first target pressure "Plow" in the drawing. The first target pressure "Plow" is the demand differential pressure calculated by the brake control ECU and corresponds to such a differential pressure, which would be generated when the driving current "Ilow" was supplied to the pressure increase valve having such IP characteristic with no deviation. The driving current "Ihigh" corresponds to the second target pressure "Phigh" in the drawing. The second target pressure "Phigh" is the demand differential pressure calculated by the brake control ECU and corresponds to such a differential pressure, which would be generated when the driving current "Ihigh" was supplied to the pressure increase valve having such IP characteristic with no deviation.

As shown in FIG. 12, the first target pressure "Plow" is gradually decreased (made smaller) in the stepwise manner with the decreasing slope "α". This is because a deviation would be generated between the assumed IP characteristic and the actual IP characteristic, as shown in FIG. 13, in relation to the differential pressure generated at the pressure increase valves 17 and 37 with respect to the driving current.

For example, in the case that the actual IP characteristic is deviated from the assumed IP characteristic to a side, in which a larger differential pressure would be generated, namely in the case that the actually generated differential pressure becomes larger than the assumed differential pressure when the same driving current for the first target pressure "Plow" is supplied, it would become difficult to increase the W/C pressure for the wheel on the high μ-road (that is, the wheel having the smaller difference between the M/C pressure and the W/C pressure) to the extent corresponding to such a deviated amount. As a result, it would be difficult to keep the difference of the W/C pressures for the front left and front right wheels FL and FR within an assumed range. However, when the first target pressure "Plow" is gradually decreased in the stepwise manner with the decreasing slope "α", the actually generated differential pressure can be gradually brought closer to a differential pressure to be generated based on the assumed IP characteristic. Therefore, it would be possible to bring the difference of the W/C pressures for the front left and front right wheels FL and FR within the assumed range.

As above, as a result that the first target pressure "Plow" is not fixed to the constant value but gradually decreased in the stepwise manner, it is possible to further reduce, during the operation of the moderate pressure increasing control, the deviation which would be generated due to the individual differences for the pressure increase valves 17 and 37.

The pressure control operation, in which the first target pressure "Plow" is decreased (made smaller), has a further advantage in addition to the decrease of the influence by the deviation which would be generated due to the individual differences for the pressure increase valves 17 and 37.

For example, in the case that the actual IP characteristic is deviated from the assumed IP characteristic to a side, in which a smaller differential pressure would be generated, namely in the case that the actually generated differential pressure becomes smaller than the assumed differential pressure when the same driving current for the first target pressure "Plow" is supplied, it would become possible to increase the W/C pressure for the wheel on the high μ-road to the extent corresponding to such a deviated amount. On the other hand, it would not be possible to increase the W/C pressure in the earlier stage, if the difference between the M/C pressure and the W/C pressure is small. However, when the first target pressure "Plow" is gradually decreased in the stepwise manner with the decreasing slope "α", it would become possible to bring the W/C pressure close to the M/C pressure in the earlier stage, although the actually generated differential pressure would be further deviated from the differential pressure to be generated based on the assumed IP characteristic.

When the brake pedal is strongly pressed by the vehicle driver, a high M/C pressure is correspondingly generated. When the pressure control is moved to the moderate pressure increasing control, the first target pressure "Plow" is set. When the pressing force for the brake pedal is released and thereby the M/C pressure is decreased, the first target pressure "Plow" set in advance may become too large in relation to the above decreased M/C pressure. However, since the first target pressure "Plow" is gradually decreased according to the present embodiment, the first target pressure "Plow" can be controlled to be an appropriate value in relation to such decreased amount of the M/C pressure.

As above, it is possible to further reduce, during the operation of the moderate pressure increasing control, the deviation which would be generated due to the individual differences for the pressure increase valves 17 and 37, when the first target pressure "Plow" is not fixed to the constant value but gradually decreased in the stepwise manner. It is possible to bring the W/C pressure closer to the M/C pressure, when the differential pressure between the M/C pressure and the W/C pressure is small. Furthermore, it is possible to bring the first target pressure "Plow" to the appropriate amount corresponding to the M/C pressure, even when the M/C pressure is decreased after the first target pressure "Plow" has been set.

In addition, according to the present embodiment, the second target pressure "Phigh" is also gradually decreased (made smaller) in the stepwise manner. The second target pressure is set at such a value, which is at the initial stage large enough to keep the differential pressure between the upstream and the downstream sides of the pressure increase valves 17 and 37.

However, as the moderate pressure increasing process is proceeded, the actual differential pressure between the upstream and the downstream sides of the pressure increase valves 17 and is decreased (made smaller). A demand value (the demand differential pressure) necessary for keeping the differential pressure can be correspondingly decreased. Therefore, the second target pressure is not fixed to the constant value but gradually decreased in the stepwise manner. Namely, the differential pressure is controlled at such a value, which is minimum required for keeping the differential pressure between the upstream and the downstream sides of the pressure increase valves 17 and 37. As a result, it becomes possible to suppress generation of noise and/or vibration, which would be otherwise generated if the differential pressure (between the M/C pressure and the W/C pressure) is maintained more than necessary.

In addition, the decremental slope "β" for the second target pressure "Phigh" is made larger than the decremental slope "α" for the first target pressure "Plow", and the decremental slope "β" has such a slope that the demand differential pressure would become the minimum value "Pmin" when the pulse number reaches a predetermined value. Accordingly, the difference between the first and second target pressures "Plow" and "Phigh" can be gradually made smaller. And when the difference between the M/C pressure and the W/C pressure becomes smaller, it becomes correspondingly difficult to increase the W/C pressure in the earlier stage by simply setting the first target pressure "Plow". However, it is possible to also increase the W/C pressure when the second target pressure "Phigh" is set. Therefore, it is possible to bring the W/C pressure close to the M/C pressure in the earlier stage, even when the difference between the M/C pressure and the W/C pressure becomes smaller.

As above, it is possible to suppress the deviation of the performance of increasing the W/C pressure by carrying out the yaw control. In other words, it is possible to suppress the difference of the W/C pressures between the front left and front right wheels FL and FR within the predetermined range. It is, thereby, possible to suppress the yaw torque applied to the vehicle and to prevent the vehicle spin.

When the pressure control for the wheel on the low μ-road is changed again to the pressure decreasing mode, the pressure for the wheel on the high μ-road is held, and the above operation will be repeated.

Second Embodiment

A second embodiment of the present invention will be explained. A braking operation of the second embodiment is different from that of the first embodiment. Other structure and operation are the same to those of the first embodiment. Different portions from the first embodiment will be explained.

According to the present embodiment, the braking operation will be carried out by use of the brake control apparatus 1 and an operation for EBD (Electronic Brake force Distribution) control is carried out for adjusting distribution of the braking forces between front and rear wheels. A structure of the brake control apparatus 1 is the same to that of the first embodiment. An operation to be carried out by the brake ECU 70 is different from the first embodiment. Hereinafter, the operation for the EBD control will be explained.

According to the EBD control, the braking force for the rear wheels is controlled depending on a difference of wheel speeds (a wheel speed difference) between the front and rear wheels when the brake pedal is operated by the vehicle driver, so that a predetermined relationship between the braking force for the rear wheels and the braking force for the front wheels is maintained. The EBD control is carried out when a starting condition is satisfied, for example, when the wheel speed difference becomes larger than a predetermined value. According to the EBD control, the W/C pressures for the rear wheels are controlled, so that the distribution of the braking force for the rear wheels is maintained within a predetermined range with respect to the distribution of the braking force for the front wheels. As a result, an early lock for the rear wheels is suppressed.

For example, the process for the EBD control is repeatedly carried out for a predetermined control cycle during the braking operation. The process for the EBD control is ended when the vehicle running is stopped or the braking operation is stopped. A main control flow for the EBD control is the same to a conventional control flow. Hereinafter, a process for the EBD control for the rear wheels RL and RR will be explained.

Figure 14:
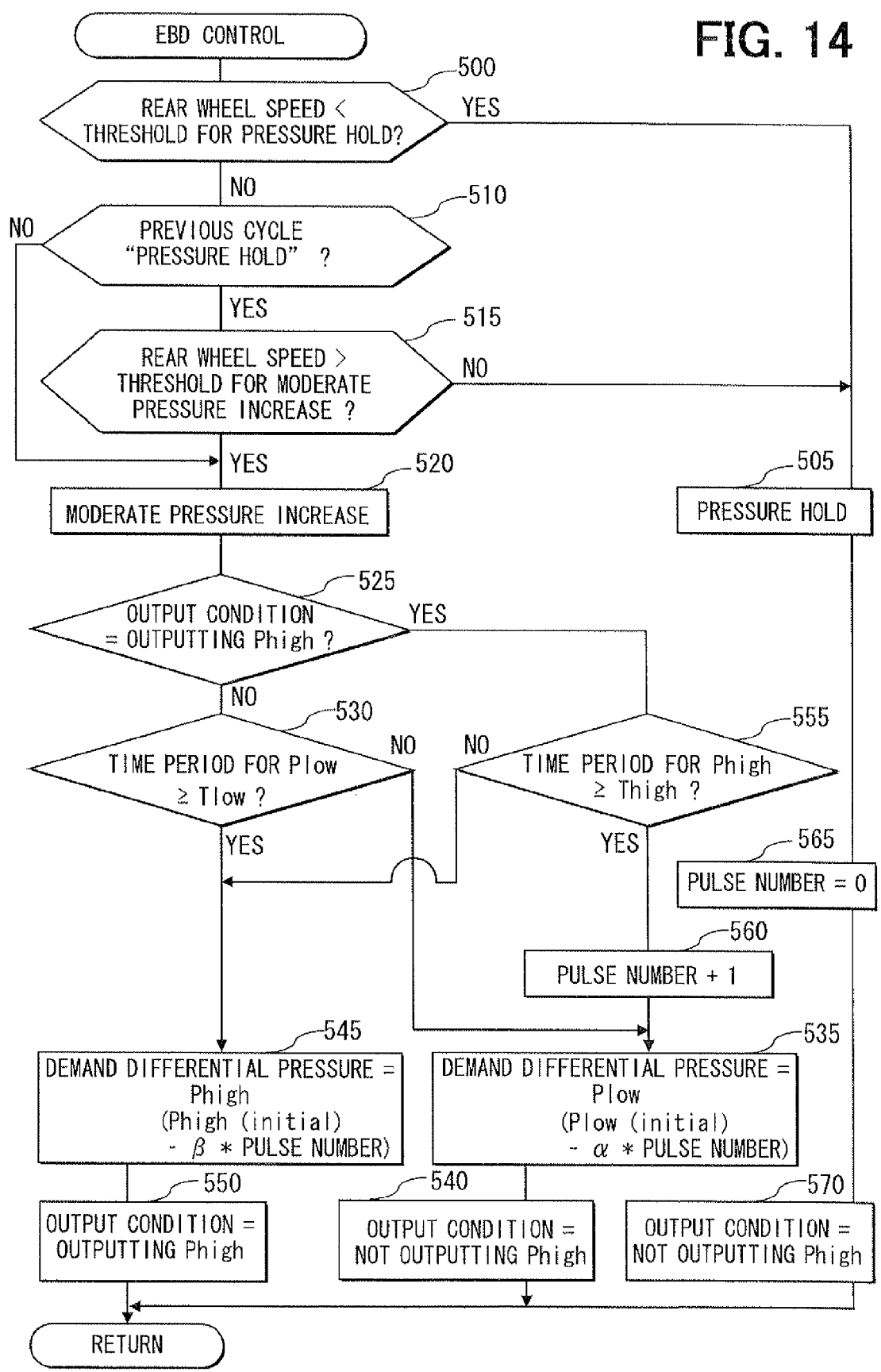
FIG. 14 is a flow chart showing a portion of processes for EBD (Electronic Braking force Distribution) control, which is carried out for rear wheels (RL and RR) according to a second embodiment of the invention.

FIG. 14 is a flowchart showing a process for the EBD control for the rear wheels RL and RR. The process of FIG. 14 is repeated for the predetermined control cycles. The explanation will be made with reference to FIG. 14.

When the process for the EBD control starts, at a step 500, the ECU 70 determines whether the wheel speed of the rear wheels becomes lower than a pressure holding threshold value. The pressure holding threshold value corresponds to such an assumed value, by which a rear wheel speed is decreased with respect to a front wheel speed (which is nearly equal to the estimated vehicle speed). For example, the pressure holding threshold value is obtained by multiplying the front wheel speed by a predetermined ratio (a first value less than "1.0"). The determination is carried out to determine whether a condition for starting a pressure holding control for the rear left and rear right wheels RL and RR is satisfied or not. However, the condition for starting the pressure holding control may be also used as a condition for starting the EBD control.

In case of YES at the step 500, the process goes to a step 505, at which the pressure holding process is carried out. More exactly, the driving currents to the solenoids of the pressure increase valves 18 and 38 corresponding to the rear wheels RR and RL are calculated. The driving currents are supplied to the pressure increase valves 18 and 38 in order to hold the W/C pressures at the rear wheels RL and RR. As a result, the decrease of the rear wheel speeds for the rear wheels RL and RR is suppressed. Thereafter, a flag is set for indicating that an output of a previous cycle was the pressure holding control, namely the pressure holding process was carried out in the previous cycle. Then, the process goes to a step 565.

In case of NO at the step 500, the process goes to a step 510, at which the ECU 70 determines whether the output of the previous cycle was the pressure holding control, namely whether the pressure holding process was carried out in the previous cycle or not. In other words, the ECU 70 determines whether the flag (indicating that the pressure holding process was carried out) is set at the step 505. In the case that the flag is set, the determination is YES. The process goes to a step 515, at which the ECU determines whether the rear wheel speed exceeds a threshold value for starting a moderate pressure increasing control. The threshold value for starting the moderate pressure increasing control corresponds to such a threshold value, with which the ECU 70 determines whether the rear wheel speed has comeback to such a speed so that the moderate pressure increasing operation may be carried out.

For example, the threshold value for starting the moderate pressure increasing control may be obtained by multiplying the front wheel speed by a predetermined ratio (a second value less than "1.0", wherein the second value is smaller than the first value used for the pressure holding threshold value). The threshold value for starting the moderate pressure increasing control is defined as a value larger than the pressure holding threshold value.

Until the determination at the step 515 becomes YES, the process goes to the step 505 to repeat the pressure holding control so that the W/C pressure for the rear wheels RL and RR is continuously held. When the determination at the step 515 becomes YES, the process goes to a step 520, at which the flag for indicating the previous output was the pressure holding control is reset and the moderate pressure increasing control is carried out.

More exactly, the driving currents to the solenoids of the pressure increase valves 18 and 38 are calculated in order to carry out the moderate pressure increasing control. The moderate pressure increasing control in the present embodiment is the same to that of the first embodiment.

When the moderate pressure increasing control starts, the same processes at the steps of 430 to 465 of FIG. 6 for the first embodiment are carried out at steps 525 to 560. Namely, the demand differential pressure and the driving current for the pressure increase valve 18 or 38 corresponding to the rear left or rear right wheel RL or RR (which is on the high μ-road) are calculated. And the pressure control operation is carried out in the way that the demand differential pressure is set at the first target pressure "Plow" for the first time period "Tlow", and then the demand differential pressure is set at the second target pressure "Phigh" for the second time period "Thigh", wherein "Phigh" is higher than "Plow". And the demand differential pressure and the driving current are so calculated that the above pressure control operation is alternately repeated and the first and second target pressures "Plow" and "Phigh" are gradually decreased in the stepwise manner.

As above, the moderate pressure increasing control is carried out as in the same manner to the first embodiment. In the case that the pressure holding process is carried out at the step 505, it is equal to the case that the moderate pressure increasing control is not carried out. Therefore, the process goes to a step 565, at which the pulse number is reset to zero. The process further goes to a step 570, at which the flag (for indicating the output condition is in the condition in which the second target pressure "Phigh" is being outputted) is reset to thereby indicate that the second target pressure "Phigh" is not being outputted. Then, the process goes to "RETURN".

Effects of the above EBD control will be explained with reference to the timing chart shown in FIG. 15, which shows speeds and pressures of related portions when the EBD control is carried out.

When the brake pedal is operated, the W/C pressures for the rear wheels are increased at a time point T1 in accordance with the increase of the M/C pressure, so that the wheel speeds of the front and rear wheels are decreased. The W/C pressures for the front wheels are also increased, so that the W/C pressures for the front wheels are almost the same to the M/C pressure.

When the rear wheel speed is decreased relative to the front wheel speed and becomes lower than the pressure holding threshold value (in other words, when the condition for starting the EBD control is satisfied), the pressure holding operation starts for the subject rear wheel RL or RR, which is on the high μ-road (the steps 500 and 505). Namely, an output for starting the EBD control is turned ON at a time point T2, and the driving current to the solenoid of the subject pressure increase valve 18 or 38 is controlled at a value equal to a value for shutting down the pressure increase valve 18 or 38, in order to hold the W/C pressure for the subject rear wheel RL or RR (on the high μ-road).

When the pressure holding operation is continued for the W/C pressure of the subject rear wheel RL or RR (on the high μ-road), a difference of the wheel speeds between the front and rear wheels becomes smaller. Then, the W/C pressure for the subject rear wheel exceeds the threshold value for starting the moderate pressure increasing control at a time point T3. The moderate pressure increasing control is started to gradually increase the W/C pressure for the subject rear wheel RL or RR (the steps 515 and 520).

The moderate pressure increasing control is carried out by repeating the pressure control, in which the demand differential pressure is set at the first target pressure "Plow" for the first time period "Tlow", and then the demand differential pressure is set at the second target pressure "Phigh" for the second time period "Thigh" (the steps 525 to 560).

As a result, it is possible to suppress the deviation of the performance (the pressure increasing slopes) for increasing the W/C pressure, which would be caused by the individual differences between the pressure increase valves 18 and 38. Even in the case that the deviation of the actual differential pressures is moved to a side, in which the differential pressure would become larger, it would be possible to suppress the rapid pressure increase. On the other hand, in the case that the deviation of the actual differential pressures is moved to the side, in which the differential pressure would become smaller, it would be possible to achieve the pressure increase to some extent. Accordingly, it is possible to generate the desired braking forces at the rear wheels RL and RR.

As in the same manner to the first embodiment, each of the first and second target pressures "Plow" and "Phigh" is not fixed to the constant value but gradually decreased (made smaller) in the stepwise manner. It is, therefore, possible to decrease the deviation for the differential pressures, which would be generated at the pressure increase valves 18 and 38 due to the individual difference thereof, during the moderate pressure increasing operation.

Figure 16:
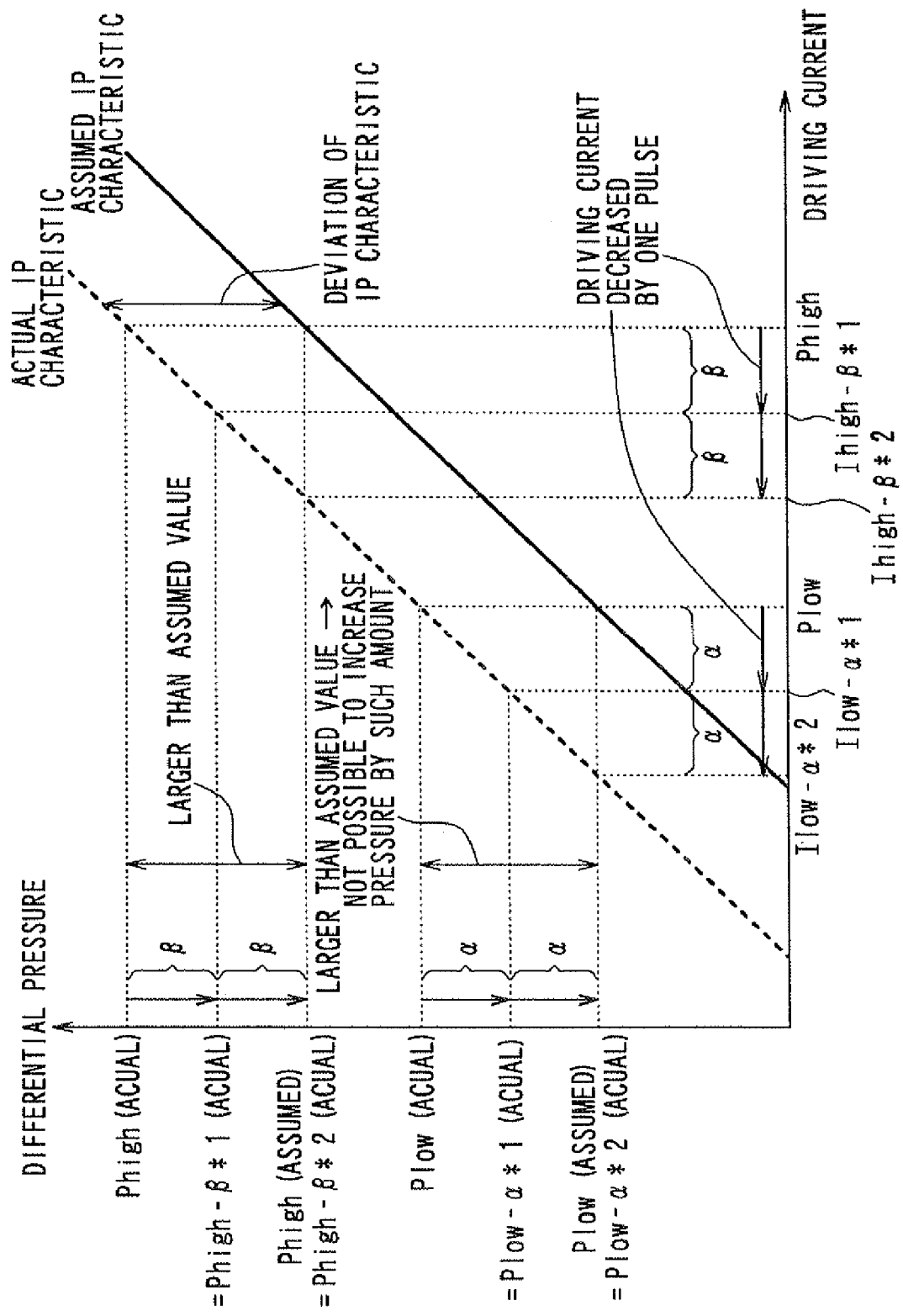
FIG. 16 is a graph showing IP characteristics, which are relationships between the driving current and differential pressure actually generated at the pressure increase valves (18 and 38)

FIG. 16 is a graph showing IP characteristics, which are relationships between the demand differential pressure (or the driving current) and the differential pressure actually generated at the pressure increase valves 18 and 38. A solid line shows an assumed IP characteristic, while a dotted line shows an example of an actual IP characteristic.

For example, in the case that the actual IP characteristic is deviated from the assumed IP characteristic to a side, in which a larger differential pressure would be generated, namely in the case that the actually generated differential pressure becomes larger than the assumed differential pressure when the same driving current for the first target pressure "Plow" is supplied, it would become difficult to increase the W/C pressure for the rear wheels RL and RR to the extent corresponding to such a deviated amount.

However, when the first target pressure "Plow" is gradually decreased in the stepwise manner with a decremental slope "α", the actually generated differential pressure can be gradually brought closer to a differential pressure to be generated based on the assumed IP characteristic. As above, since the first target pressure "Plow" is not fixed to the constant value but gradually decreased (made smaller) in the stepwise manner, it becomes possible to decrease the deviation for the differential pressures, which would be generated at the pressure increase valves 18 and 38 due to the individual difference thereof, during the moderate pressure increasing operation.

Furthermore, even in the case that that the actual IP characteristic is deviated from the assumed IP characteristic to a side, in which a smaller differential pressure would be generated, the first target pressure "Plow" is gradually decreased in the stepwise manner. In such a situation, it would be possible, at an earlier stage, to bring the W/C pressure of the rear wheels RL and RR closer to the W/C pressure of the front wheels FL and FR (nearly equal to the M/C pressure). If the rear wheel speed would exceed again the pressure holding threshold value, the pressure holding control would be started again. Therefore, no problem may occur, even in the case that the W/C pressure of the rear wheels RL and RR would be brought at the earlier stage closer to the W/C pressure of the front wheels FL and FR.

In addition, according to the present embodiment, the second target pressure "Phigh" is also gradually decreased (made smaller) in the stepwise manner, as in the same manner to the first embodiment. The second target pressure is set at such a value, which is large enough to keep the differential pressure between the upstream and the downstream sides of the pressure increase valves 18 and 38.

However, as the moderate pressure increasing operation is proceeded, the differential pressure between the upstream and the downstream sides of the pressure increase valves 18 and 38 is decreased (made smaller). A value necessary for keeping the differential pressure will be correspondingly decreased. Therefore, when the second target pressure is not fixed to the constant value but gradually decreased in the stepwise manner, the differential pressure can be controlled at such a value, which is minimum required for keeping the differential pressure between the upstream and the downstream sides of the pressure increase valves 18 and 38. As a result, it becomes possible to suppress generation of noises and/or vibration, which would be otherwise generated if the differential pressure is maintained more than necessary.

In addition, the decremental slope "β" for the second target pressure "Phigh" is made larger than the decremental slope "α" for the first target pressure "Plow", and the decremental slope "β" has such a slope that the demand differential pressure would become the minimum value "Pmin" when the pulse number reaches a predetermined value. Accordingly, the difference between the first and second target pressures "Plow" and "Phigh" can be gradually made smaller. And when the difference between the M/C pressure and the W/C pressure becomes smaller, it becomes correspondingly difficult to increase the W/C pressure in the earlier stage by simply setting the first target pressure "Plow". However, it is possible to also increase the W/C pressure when the second target pressure "Phigh" is set. Therefore, it is possible to bring the W/C pressure close to the M/C pressure in the earlier stage, even when the difference between the M/C pressure and the W/C pressure becomes smaller.

Figure 15:
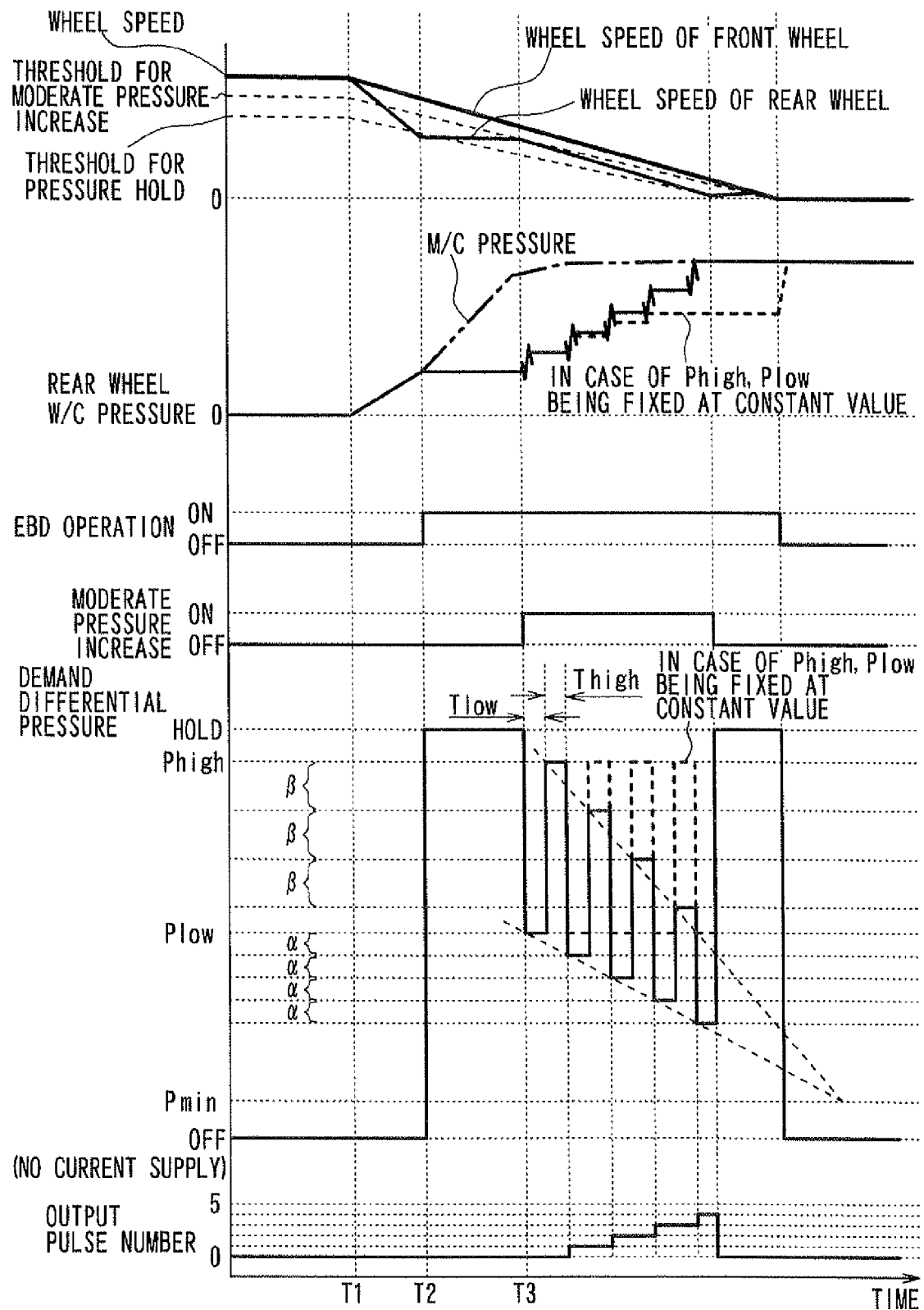
FIG. 15 is a graph showing speeds and pressures of related portions when the EBD control is carried out.
Figure 17:
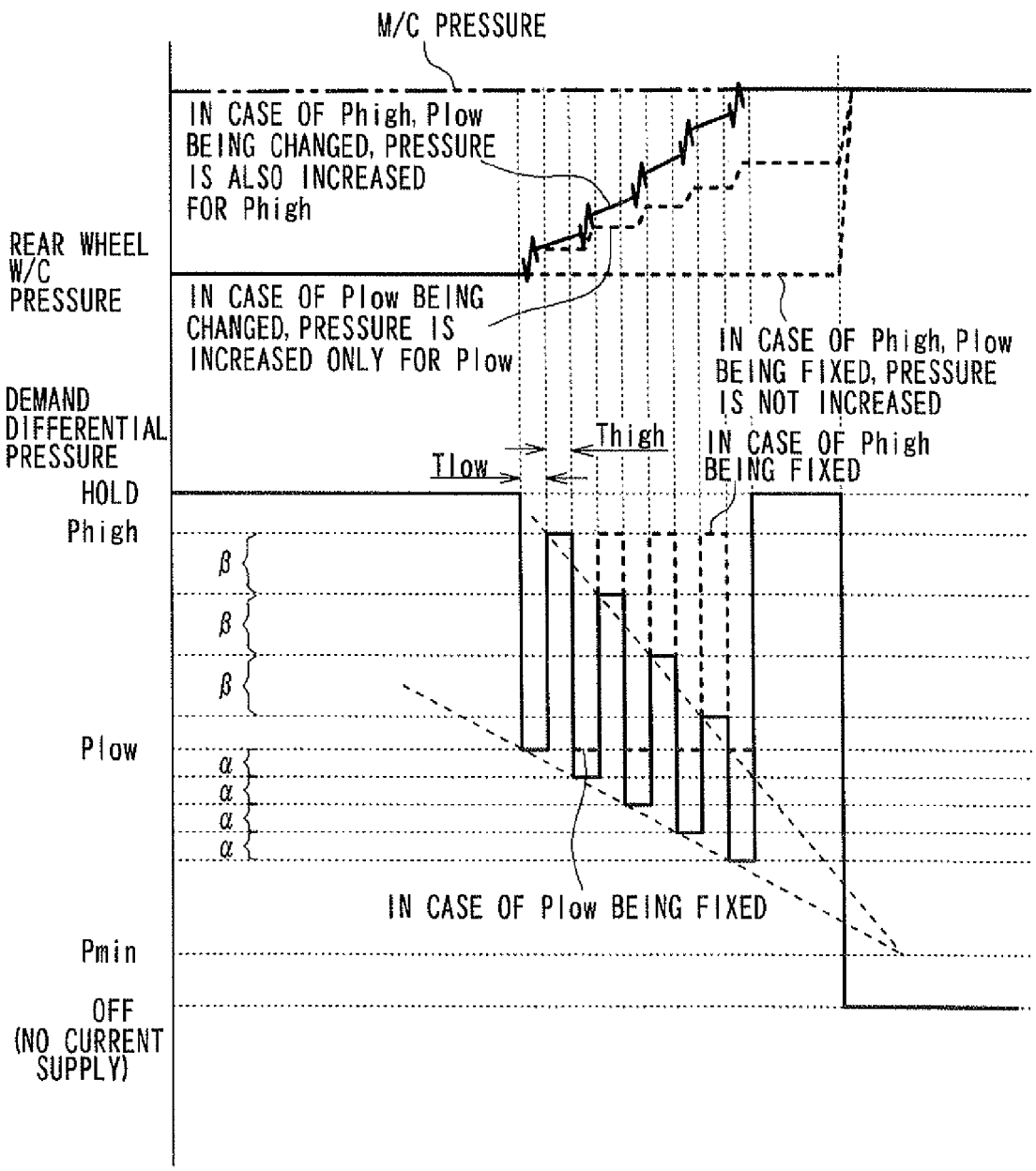
FIG. 17 is an enlarged timing chart showing a part of the timing chart shown in FIG. 15, wherein the wheel cylinder pressures for the rear wheels (RL and RR) are coming closer to a master cylinder pressure.

FIG. 17 is an enlarged timing chart showing a part of the timing chart of FIG. 15, in which the W/C pressures for the rear wheels RL and RR are coming closer to the M/C pressure.

As shown in FIG. 17, in the case that the driving currents "Ilow" and "Ihigh" (which correspond to the first and second target pressures "Plow" and "Phigh", respectively) were fixed to the constant values, it would not be possible to increase the W/C pressure for the rear wheels RL and RR until the W/C pressures for the rear wheels RL and RR would become close to the M/C pressure. This is because there is the deviation between the actual IP characteristic and the assumed IP characteristic, which would be generated by the individual difference between them.

However, according to the present embodiment, as a result that the first target pressure "Plow" is gradually decreased in the stepwise manner, it becomes possible to decrease the deviation for the differential pressures, which would be generated at the pressure increase valves 18 and 38 due to the individual difference thereof, during the moderate pressure increasing operation.

In addition, according to the present embodiment, the second target pressures "Phigh" is likewise not fixed to the constant value but gradually decreased in the stepwise manner, and the decremental slope "β" for the second target pressure "Phigh" is made larger than the decremental slope "α" for the first target pressure "Plow". Therefore, it is possible to gradually increase the W/C pressure and also to bring the W/C pressure closer to the M/C pressure in an earlier timing than that of the pressure control by the first target pressure "Plow", when the demand differential pressure for the pressure increase valve 18 or 38 is set at the second target pressure "Phigh".

Other Embodiments

In the above first and second embodiments, the ABS control with the select-low control on the road and the EBD control are explained. The problem of the deviation in the performance of increasing the W/C pressure, which would be caused by the individual difference of the pressure increase valves, may exist in any kinds of the brake control apparatuses, in which the differential pressure is generated by linearly operating the pressure increase valves so as to control the W/C pressure.

Therefore, the same effects of the first and/or second embodiments may be obtained for the other types of the brake control apparatuses, when the moderate pressure increasing control is carried out, and the demand differential pressure for the subject pressure increase valve (17, 18, 37, 38) is alternately controlled at the first and second target pressures "Plow" and "Phigh" and the demand differential pressures are gradually decreased in the stepwise manner during such moderate pressure increasing operation.

In the above embodiments, the first target pressure "Plow" is decreased with the uniform decremental slope "α". However, the decremental amount "α" may be gradually increased or decreased. In the same manner, the decremental amount "β" for the second target pressure "Phigh" may be gradually increased or decreased.

In the above embodiments, the decremental slope "α" is smaller than the decremental amount "β". However, the decremental slope "α" may be made equal to or larger than the decremental amount "β".

In the above embodiments, the decremental slope "α" as well as the decremental amount "β" is defined in such a manner that the demand differential pressure reaches the minimum pressure "Pmin", when each of the first and second target pressures "Plow" and "Phigh" is decreased by the predetermined pulse number. The decremental slopes "α" and "β" may be defined by any other manners.

In the drawings, the steps 425 to 465 of FIG. 6 and the steps 520 to 560 of FIG. 14 are also referred to as a power supply amount control portion, the step 440 of FIG. 6 and the step 535 of FIG. 14 are also referred to as a first target pressure setting portion, and the step 450 of FIG. 6 and the step 545 are also referred to as a second differential pressure setting portion.

What is claimed is:
1. A brake control apparatus for a vehicle, comprising:
a master cylinder supplying brake fluid under pressure to wheel cylinders;
pressure increase valves connected between the master cylinder and the wheel cylinders for controlling a differential pressure between upstream and downstream sides of the pressure increase valves by linearly controlling power supply amount to corresponding solenoids of the pressure increase valves, the pressure increase valves controlling the differential pressure to increase the brake fluid pressure applied to each wheel cylinder during a braking operation; and
an electronic control unit for controlling each of the pressure increase valves,
the electronic control unit comprising:
a power supply amount control portion for controlling the power supply amount to a respective solenoid of a respective pressure increase valve for one wheel cylinder of the wheel cylinders while a pressure increasing operation is carried out for the one wheel cylinder, the power supply amount control portion alternately setting a demand differential pressure for the respective pressure increase valve at a first target pressure and a second target pressure, the second target pressure being higher than the first target pressure, and both the first and second target pressures corresponding to the differential pressure between upstream and downstream sides of the respective pressure increase valve,
a first differential pressure setting portion for setting the first target pressure by decreasing the first target pressure in a stepwise manner each time when the demand differential pressure is switched from the first target pressure to the second target pressure, a second differential pressure setting portion for setting the second target pressure by decreasing that the second target pressure in a stepwise manner each time when the demand differential pressure is switched from the second target pressure to the first target pressure, wherein the first differential pressure setting portion decreases the first target pressure with a first predetermined decremental slope, and wherein the second differential pressure setting portion decreases the second target pressure with a second predetermined decremental slope, and the second predetermined decremental slope is larger than the first predetermined decremental slope.

2. The brake control apparatus according to claim 1, wherein the electronic control unit carries out an anti-skid control for preventing a locked condition of wheels during the braking operation, the electronic control unit carries out a select-low control when the vehicle is running on a μ-split road, so that a pressure decreasing operation of the anti-skid control is carried out for not only the wheel on a low μ-road but also the wheel on a high g-road when the anti-skid control is started for the wheel on the low μ-road, irrespectively whether a condition for starting the anti-skid control for the wheel on the high μ-road is satisfied or not, the electronic control unit linearly changes the power supply amount to the solenoid of the pressure increase valve, which corresponds to the wheel cylinder for which a pressure increasing operation of the anti-skid control is carried out, to control the differential pressure of the subject pressure increase valve, so that the wheel cylinder pressure for the subject wheel cylinder is increased, the electronic control unit further comprises a calculating portion for respectively calculating estimated wheel cylinder pressures for a front left and a front right wheels, the electronic control unit further comprises a determination portion for determining whether the vehicle is running on the μ-split road and whether each of the front left and front right wheels is on the high μ-road or on the low μ-road, based on the respective estimated wheel cylinder pressures for the front left and front right wheels, and the electronic control unit controls the power supply amount to the solenoid of the pressure increase valve, which corresponds to the front wheel on the high μ-road, when the pressure increasing operation of the anti-skid control is carried out for the wheel on the high μ-road, so that the demand differential pressure for the subject pressure increase valve is alternately changed to the first and second target pressures.

3. The brake control apparatus according to claim 1, wherein the electronic control unit controls distribution of braking force between front wheels and rear wheels, so that the wheel cylinder pressure for the rear wheels is controlled to be lower than the wheel cylinder pressure for the front wheels in order to prevent a locked condition for the rear wheels, the electronic control unit linearly changes the power supply amount to the solenoid of the pressure increase valve, which corresponds to the wheel cylinder of the rear wheels for which a pressure increasing operation of the braking force distribution control is carried out, to control the differential pressure of the subject pressure increase valve, so that the wheel cylinder pressure for the subject wheel cylinder is increased, and the electronic control unit controls the power supply amount to the solenoid of the pressure increase valve corresponding to the subject rear wheel, when the pressure increasing operation of the braking force distribution control is carried out for the subject rear wheel, so that the demand differential pressure for the subject pressure increase valve is alternately changed to the first and second target pressures.

* * * * *